US010964982B2

(12) United States Patent
An et al.

(10) Patent No.: US 10,964,982 B2
(45) Date of Patent: Mar. 30, 2021

(54) RECHARGEABLE METAL-AIR BATTERY CELL, A BATTERY STACK AND METHOD OF MANUFACTURING THE SAME

(71) Applicant: AGENCY FOR SCIENCE, TECHNOLOGY AND RESEARCH, Singapore (SG)

(72) Inventors: Tao An, Singapore (SG); Xiaoming Ge, Singapore (SG); Zhao Lin Liu, Singapore (SG); Yun Zong, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 62 days.

(21) Appl. No.: 16/333,588

(22) PCT Filed: Sep. 15, 2017

(86) PCT No.: PCT/SG2017/050466
§ 371 (c)(1),
(2) Date: Mar. 14, 2019

(87) PCT Pub. No.: WO2018/052376
PCT Pub. Date: Mar. 22, 2018

(65) Prior Publication Data
US 2019/0260064 A1    Aug. 22, 2019

(30) Foreign Application Priority Data
Sep. 16, 2016   (SG) .......................... 10201607775P

(51) Int. Cl.
*H01M 12/08*    (2006.01)
*H01M 4/38*     (2006.01)
*H01M 10/04*    (2006.01)

(52) U.S. Cl.
CPC ............. *H01M 12/08* (2013.01); *H01M 4/38* (2013.01); *H01M 10/0418* (2013.01); *Y02E 60/10* (2013.01)

(58) Field of Classification Search
None
See application file for complete search history.

(56) References Cited

U.S. PATENT DOCUMENTS

| 3,539,396 A | 11/1970 | Wagner |
| 3,717,505 A | 2/1973 | Unkle, Jr. et al. |

(Continued)

FOREIGN PATENT DOCUMENTS

| CN | 103647101 A | 3/2014 |
| CN | 104241671 A | 12/2014 |

(Continued)

OTHER PUBLICATIONS

International Search Report and the Written Opinion of the International Searching Authority for International Application No. PCT/SG2017/050466 dated Dec. 1, 2017.

(Continued)

*Primary Examiner* — Scott J. Chmielecki
(74) *Attorney, Agent, or Firm* — Womble Bond Dickinson (US) LLP

(57) ABSTRACT

A Rechargeable Metal-Air Battery Cell, a Battery Stack and Method of Manufacturing the Same A rechargeable metal-air battery cell, a battery stack and method of manufacturing the same are provided. The rechargeable metal-air battery cell includes a bipolar plate, an air cathode, a plenum frame and a metal anode. The bipolar plate defines a plurality of air channels. The air cathode abuts the bipolar plate such that the air cathode is in fluid communication with the air channels. The plenum frame includes a first major surface and a second major surface opposite the first major surface.

(Continued)

The air cathode is adjacent the first major surface, and the metal anode is adjacent the second major surface of the plenum frame. The battery stack may include at least one rechargeable metal-air battery cell.

17 Claims, 20 Drawing Sheets

(56) References Cited

U.S. PATENT DOCUMENTS

| | | | |
|---|---|---|---|
| 4,614,025 A | | 9/1986 | Vanommering et al. |
| 4,714,662 A | * | 12/1987 | Bennett ............. H01M 10/0413 |
| | | | 429/403 |
| 4,828,939 A | | 5/1989 | Turley et al. |
| 4,842,963 A | | 6/1989 | Ross, Jr. |
| 4,957,826 A | | 9/1990 | Cheiky |
| 4,988,581 A | | 1/1991 | Wycliffe |
| 5,891,589 A | | 4/1999 | Witzigreuter et al. |
| 6,235,418 B1 | | 5/2001 | Pedicni |
| 8,492,052 B2 | | 7/2013 | Friesen et al. |
| 8,951,682 B2 | | 2/2015 | Yager |
| 2002/0110719 A1 | | 8/2002 | Pien et al. |
| 2003/0059664 A1 | * | 3/2003 | Menjak ............... H01M 4/8673 |
| | | | 429/218.2 |
| 2011/0045375 A1 | | 2/2011 | Makita et al. |
| 2014/0138591 A1 | * | 5/2014 | Yoon ................... H01M 4/5825 |
| | | | 252/519.14 |
| 2015/0010833 A1 | * | 1/2015 | Amendola ............ H01M 10/26 |
| | | | 429/406 |

FOREIGN PATENT DOCUMENTS

| | | |
|---|---|---|
| EP | 0294327 A2 | 12/1988 |
| EP | 0330849 A2 | 9/1989 |
| EP | 0405558 A2 | 1/1991 |
| EP | 2528156 A1 | 11/2012 |
| EP | 2824755 A1 | 1/2015 |
| EP | 2882032 A1 | 6/2015 |
| WO | 2006/101280 A1 | 9/2006 |
| WO | 2012/156972 A1 | 11/2012 |
| WO | 2013/110097 A1 | 8/2013 |
| WO | 2013/157213 A1 | 10/2013 |
| WO | 2015/004069 A1 | 1/2015 |

OTHER PUBLICATIONS

International Preliminary Report on Patentability for International Application No. PCT/SG2017/050466 dated Aug. 31, 2018.

* cited by examiner

RECHARGEABLE METAL-AIR BATTERY CELL, A BATTERY STACK AND METHOD OF MANUFACTURING THE SAME

CROSS-REFERENCE TO RELATED APPLICATIONS

This patent application is a U.S. National Phase Application Under 35 U.S.C § 371 of International Application No. PCT/SG2017/050466, filed on Sep. 15, 2017, entitled "A RECHARGEABLE METAL-AIR BATTERY CELL, A BATTERY STACK AND METHOD OF MANUFACTURING THE SAME," which claims the benefit of priority of Singapore Patent Application No. 10201607775P, filed on Sep. 16, 2016.

TECHNICAL FIELD

The present invention generally relates to a rechargeable metal-air battery cell, a battery stack and method of manufacturing the same.

BACKGROUND ART

With growing concerns over energy security and environmental issues associated with conventional fossil fuels, power generation from renewable energy resources, such as solar energy, wind power, tidal power and hydropower, has attracted global interests and worldwide efforts have been made in their development. In order to address the intermittent nature of renewable energy and to facilitate their deployment, there is an imperative need to develop efficient energy storage technology to alleviate power swings between peak and off-peak periods. It is necessary for these energy storage systems to have good operational stability, environmental benignity, low cost and high efficiency. One such effective device is an rechargeable battery that is able to facilitate increasing integration of renewable energy sources with micro electrical utility grids. However, to date, no battery systems have been proven to be commercially viable for such large-scale energy storage application. The traditional lead-acid battery is plagued with low specific energy (~40 Wh/kg) and lead pollution problem, while the costs of high-rate batteries, such as lithium-ion battery, are currently too high. Sodium-sulfur batteries operate at elevated temperatures and contain hazardous chemicals. The operating safety of lithium-ion and sodium-sulfur batteries is another issue. A battery system that can largely fulfill the critical requirements for grid scale energy storage application is the electrically rechargeable metal-air battery. In particular, electrically rechargeable metal-air batteries can be capable of delivering high energy capacities, making them a viable candidate for the large-scale deployment of renewable energy sources.

Generally, a metal-air battery utilizes electrochemical reactions between metals and oxygen molecules amid a suitable electrolyte media. It typically includes one or more air permeable cathodes and a metallic anode that are separated by a liquid electrolyte. Typical operating voltage of a single metal-air cell ranges from 1.0 V to 3.0 V, depending on the battery chemistry. To meet the requirement for high-power energy storage, hundreds of individual metal-air cells may be electrically connected to form a metal-air battery stack.

Both primary and secondary metal-air battery stacks have been developed. Metal-air primary (non-rechargeable) battery stacks are known in the art for emergency, consumable and remote applications. Mechanically rechargeable metal-air battery (metal-air fuel cell) is regarded as a primary cell per se but with changeable or regenerative anode fuels. Electrically rechargeable metal-air batteries are preferred for advantages of lower costs, environmental benignity and market requirements. In particular, electrically rechargeable batteries are crucial in the deployments of renewable energy sources as they are capable of being integrated into micro grid, which was impossible for primary or mechanically rechargeable battery stacks. During typical charging operation of electrically rechargeable metal-air battery, electricity from an external source, such as a micro grid, can be used to re-deposited metals back onto the metal electrode and generate oxygen on the air electrode. There have been various attempts to develop electrically rechargeable metal-air batteries, either single cells or stacks.

However, there are problems common to rechargeable metal-air batteries, which lead to issues with stability and reliability of battery performance. The problems common to rechargeable metal-air cells include cell swelling, as during a discharge cycle, the volume of the discharge products (e.g. metal oxides) is roughly twice the volume of the metal itself. This leads to the expansion of cell at discharge, and on the other hand, the cell contracts when the metal anode is recharged. Thus after multiple discharge-charge cycles, the cell fails mechanically due to the repeating swellings and contractions. Another major problem of rechargeable metal-air battery is the formation of metal dendrites during the charging stage, which lead to short-circuit when they reach the air cathode, as well as anode shape changing, causing deformation of the battery stack and steady falloff of performance (e.g. capacity fading, voltage drop, and voltage irregularities). Other problems include the carbonate formation of electrolyte and the dry-out of electrolyte.

Accordingly, what is needed is a rechargeable metal-air battery cell, a battery stack and method of manufacturing the same that seek to address some of the above problems. Furthermore, other desirable features and characteristics will become apparent from the subsequent detailed description and the appended claims, taken in conjunction with the accompanying drawings and this background of the disclosure.

SUMMARY OF INVENTION

A first aspect of the present invention provides a rechargeable metal-air battery cell. The rechargeable metal-air battery cell comprises a bipolar plate defining a plurality of air channels, an air cathode abutting the bipolar plate such that the air cathode is in fluid communication with the air channels, a plenum frame comprising a first major surface and a second major surface opposite the first major surface, wherein the air cathode is adjacent the first major surface, and a metal anode adjacent the second major surface of the plenum frame.

The bipolar plate may comprise a first major surface configured to abut a metal anode of an adjacent cell and a second major surface comprising a plurality of first grooves.

The bipolar plate may further comprise an edge surface. The edge surface may comprise a plurality of holes in fluid communication with the plurality of first grooves for forming the air channels.

The first major surface may further comprise a plurality of second grooves extending across the bipolar plate. The second grooves may be in fluid communication with the first grooves for forming the air channels.

The air cathode may comprise a bifunctional catalyst. The bifunctional catalyst may comprise one or more of a group consisting of: cobalt oxides where the cobalt has an oxidation state of +2 to +3, manganese oxide where the manganese has an oxidation state of +2 to +4, binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, and perovskite oxides containing lanthanide, rare earth metals and first-row transition metals.

The rechargeable metal-air battery cell may further comprise an auxiliary electrode disposed within the plenum frame. The auxiliary electrode may be configured for charging of the battery cell.

The auxiliary electrode may comprise an oxygen evolution reaction (OER) catalyst. The OER catalyst may comprise one or more of a group consisting of: ruthenium oxides, metallic ruthenium, metallic iridium, iridium oxides, cobalt oxides where the cobalt has an oxidation state of +2 to +3, binary cobalt-manganese binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, and perovskite oxides containing lanthanide, rare earth metals and first-row transition metals.

The air cathode may comprise an oxygen reduction reaction (ORR) catalyst. The ORR catalyst may comprise one or more of a group consisting of: cobalt oxides where the cobalt has an oxidation state of +2 to +3, manganese oxide where the manganese has an oxidation state of +2 to +4, binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, perovskite oxides containing lanthanide, rare earth metals and first-row transition metals, platinum-carbon, platinum alloys-carbon, nitrogen-doped carbon, boron-doped carbon, phosphorous-doped carbon, iron-carbon, cobalt-carbon, and iron cobalt-carbon.

A battery stack may comprise at least one rechargeable metal-air battery cell of the first aspect of the present invention.

The battery stack may comprise a plurality of battery cells. The bipolar plate of one battery cell may abut a corresponding metal anode of an adjacent battery cell to provide electrical connection with said adjacent cell.

The battery stack may further comprise a first end plate and a second end plate. The at least one rechargeable metal-air battery cell may be disposed between the first and the second end plates and a compression device may be configured to act on the first and the second end plates to exert a compressive force on the at least one rechargeable metal-air battery cell.

A second aspect of the present invention provides a method of manufacturing a rechargeable metal-air battery cell. The method comprises providing a metal anode, disposing a plenum frame comprising a first major surface and a second major surface opposite the first major surface such that the metal anode is adjacent the second major surface, disposing an air cathode adjacent the first major surface of the plenum frame and attaching a bipolar plate comprising a plurality of air channels to the air cathode, such that the air cathode is in fluid communication with the air channels.

The step of attaching the bipolar plate may comprise providing the bipolar plate. The bipolar plate may have a plurality of first grooves on a first major surface of the bipolar plate and a plurality of holes on an edge surface of the bipolar plate, wherein the plurality of holes are in fluid communication with the plurality of first grooves for forming the air channels.

The step of attaching the bipolar plate may comprise providing the bipolar plate. The bipolar plate may have a plurality of first grooves on a first major surface of the bipolar plate, and a plurality of second grooves on a second major surface opposite the first major surface, wherein the second grooves extend across the bipolar plate and are in fluid communication with the first grooves for forming the air channels.

The air cathode may comprise a bifunctional catalyst. The bifunctional catalyst may comprise one or more of a group consisting of: cobalt oxides where the cobalt has an oxidation state of +2 to +3, manganese oxide where the manganese has an oxidation state of +2 to +4, binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, and perovskite oxides containing lanthanide, rare earth metals and first-row transition metals.

The method of manufacturing the rechargeable metal-air battery cell may further comprise disposing an auxiliary electrode within the plenum frame, and configuring the auxiliary electrode for charging of the battery cell.

The auxiliary electrode may comprise an oxygen evolution reaction (OER) catalyst. The OER catalyst may comprise one or more of a group consisting of: ruthenium oxides, metallic ruthenium, metallic iridium, iridium oxides, cobalt oxides where the cobalt has an oxidation state of +2 to +3, binary cobalt-manganese binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, and perovskite oxides containing lanthanide, rare earth metals and first-row transition metals.

The air cathode may comprise an oxygen reduction reaction (ORR) catalyst. The ORR catalyst may comprise one or more of a group consisting of: cobalt oxides where the cobalt has an oxidation state of +2 to +3, manganese oxide where the manganese has an oxidation state of +2 to +4, binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, perovskite oxides containing lanthanide, rare earth metals and first-row transition metals, platinum-carbon, platinum alloys-carbon, nitrogen-doped carbon, boron-doped carbon, phosphorous-doped carbon, iron-carbon, cobalt-carbon, and iron cobalt-carbon.

A method of manufacturing a battery stack may comprise manufacturing at least one rechargeable metal-air battery cell according to the second aspect of the present invention, and stacking the at least one rechargeable metal-air battery cell.

The method of manufacturing the battery stack may comprise manufacturing and stacking a plurality of battery cells such that the bipolar plate of one battery cell abuts a corresponding metal anode of an adjacent battery cell.

The method of manufacturing the battery stack may further comprise disposing a first end plate at a first end of the at least one rechargeable metal-air battery cell, disposing a second end plate at a second end of the at least one rechargeable metal-air battery cell and compressing the first and the second end plates to exert a compressive force on the at least one rechargeable metal-air battery cell.

BRIEF DESCRIPTION OF DRAWINGS

Embodiments of the invention will be better understood and readily apparent to one of ordinary skill in the art from the following written description, by way of example only, and in conjunction with the drawings, in which.

Figure 1:
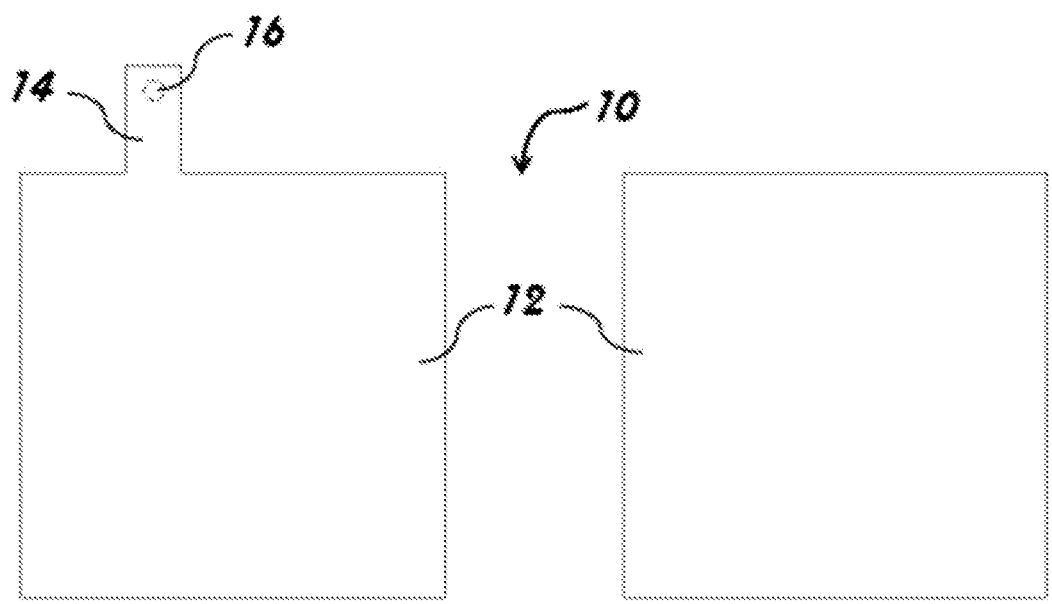
FIG. 1 shows a side view of an exemplary metal anode with an optional feature of a protruded current collection terminal, in accordance with embodiments of the invention.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DESCRIPTION OF EMBODIMENTS

Overview

Embodiments of the present invention seek to provide a compact, light-weight and efficient electrically rechargeable metal-air battery stack with high energy density (Wh/kg) and power density (W/kg). Embodiments of the present invention can advantageously minimize cell resistance, which arises from the intrinsic resistance of battery components and the contact resistance at the electric connections among battery components and external circuits. The contact resistance is minimized by employment of a bipolar design and the usage of planar cell components. In contrast to the general tubular design with the problem of long current connection path, the bipolar design enables face-toface connection of cell components, thus the current collection path is advantageously independent on the battery size and dimension. The contact resistance is further minimized by the employment of a compression assembly design. Embodiments of the present invention also seek to achieve stable and reliable battery performance by seeking to resolve the cell swelling/contraction phenomenon common to rechargeable metal-air batteries. In embodiments of the present invention, the problem is circumvented at two aspects. Firstly, a plenum is contrived between the metal anode and air cathode, so that the discharge products are accommodated in the plenum and do not lead to cell swelling. Secondly, the battery is assembled under a compression design, and such compression force is applied on the peripheral non-working area of the battery cell, so that the cell swelling and cell contraction problems do not occur. These problems are circumvented by a flow cell design and the associated flow electrolyte management system employed in embodiments of the present invention. The flow cell design substantially prevents metal dendrite formation as the metallic ions are continuously recirculated through the battery, thus reducing the buildup of such concentrations inside the battery stack. The conductivity and quantity of electrolyte are monitored and managed in an external electrolyte reservoir.

Embodiments of the present invention also seek to provide a robust metal-air battery stack by arranging the fragile air cathodes inside the battery stack. Traditionally, most metal-air batteries are in a form where the cathode surfaces face outward. Such designs necessitate special mechanical protection of the air cathode e.g. frames, ribs, screens and flanges, and thus increase the weight and/or volume of the battery stack. Embodiments of the present invention can advantageously alleviate the need for such mechanical protection. Herein, the bipolar plates in various embodiments define a plurality of air channels and are configured to abut the air cathodes which are positioned within the battery stack, such that the air cathodes are in fluid communication with the plurality of air channels. Thus, the bipolar plates can provide mechanical protection of the air cathodes while allowing air to diffuse from either its side walls or from the one side without compromising the sealing quality of the plenum chamber on the other side. More advantageously, as will be explained in more detail below, the bipolar plates can efficiently maintain electrical connection between adjacent battery cells within the battery stack, as each bipolar plate can electrically connect the air cathode of the battery cell with a metal anode of an adjacent battery cell. This enables the individual cells to connect in series to form the battery stack, which can deliver higher output voltage and thus has wider ranges of applications.

Exemplary Embodiments

Embodiments of the present invention will be described, by way of example only, with reference to the drawings. Like reference numerals and characters in the drawings refer to like elements or equivalents.

A bipolar and planar design has been provided in accordance with embodiments of the invention to create a robust, light-weight and efficient electrically rechargeable metal-air battery stack. The metal-air battery stack incorporates previously unexplored types of bipolar plates, plenum chambers, flowing electrolyte, current collection methods and battery assembly, and thus can minimize the cell impedance, enhance the cell reliability and performance and achieve robust battery stack assembly. These technological advances are described in details in this section.

An aspect of the invention is directed to the design and manufacturing of a planar battery stack fixture, whose cross-section can be, but not limited to, square, rectangular, circular, trapezoidal, diamond, triangular, and hexagonal. In a preferred embodiment, the cross section of the battery stack is square-shaped. The chemistry of this metal-air battery stack can be based on zinc-air, iron-air, aluminum-air and lithium-oxygen. In an embodiment, the chemistry is zinc-air and therefore, zinc-air battery stack.

Unless specifically stated otherwise, it will be appreciated that throughout the present specification, the term "single cell" used herein is intended to define a cell that comprises one metal anode, one air cathode, and a corresponding electrolyte that is constructed in accordance with embodiments of the present invention. The battery cell may further include an auxiliary electrode for oxygen evolution reaction (OER) (thus described by the term "three-electrode design) or have no such auxiliary electrode (thus described by the term "two-electrode design). The terms "battery" and "battery stack" as used herein are intended to define a device that is constructed in accordance with embodiments of the present invention, which comprises one or more single cells connected in tandem.

The Metallic Anode

In embodiments of the invention, there is provided a metal anode 10 in accordance with the planar design as shown in FIG. 1. It can be appreciated that the metal anode 10 can be in forms of, but not limited to, metallic plates, sintered aggregates on inert matrix (e.g. sintered metal-binder-carbon plaque on nickel mesh), electrodeposits on inert matrix (e.g. nickel sheet and titanium sheet), and pastes on inert matrix. In an embodiment, the metal anode 10 comprises a metal plate 12 with an optional protruded flag 14 as a current collection terminal, in which a screw hole 16 is made to facilitate the connection to external circuit.

The Plenum Frame

Figure 2:
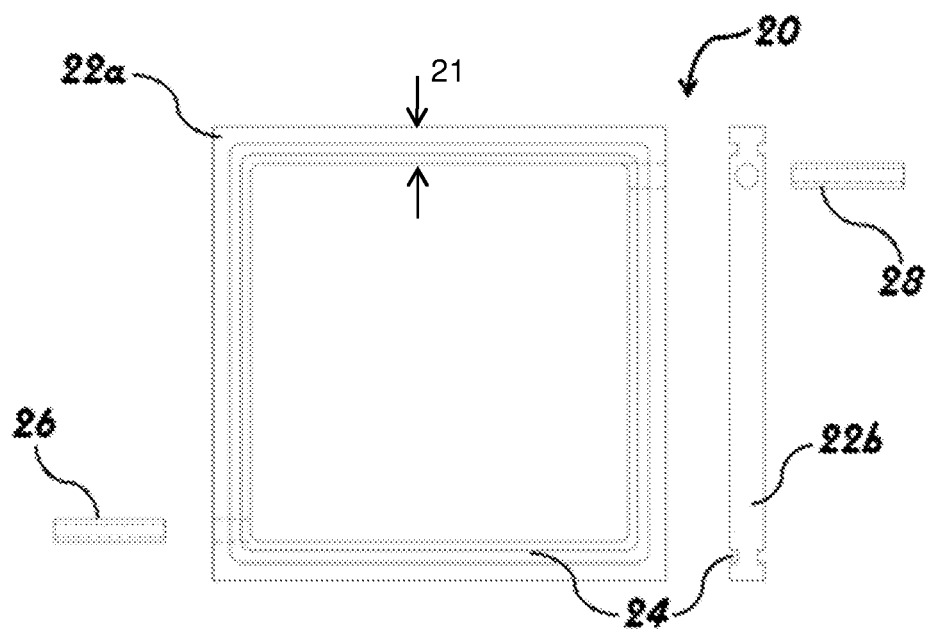
FIG. 2 shows a side view and respective end views of an exemplary plenum frame for a two-electrode battery cell, in accordance with embodiments of the invention.
Figure 3:
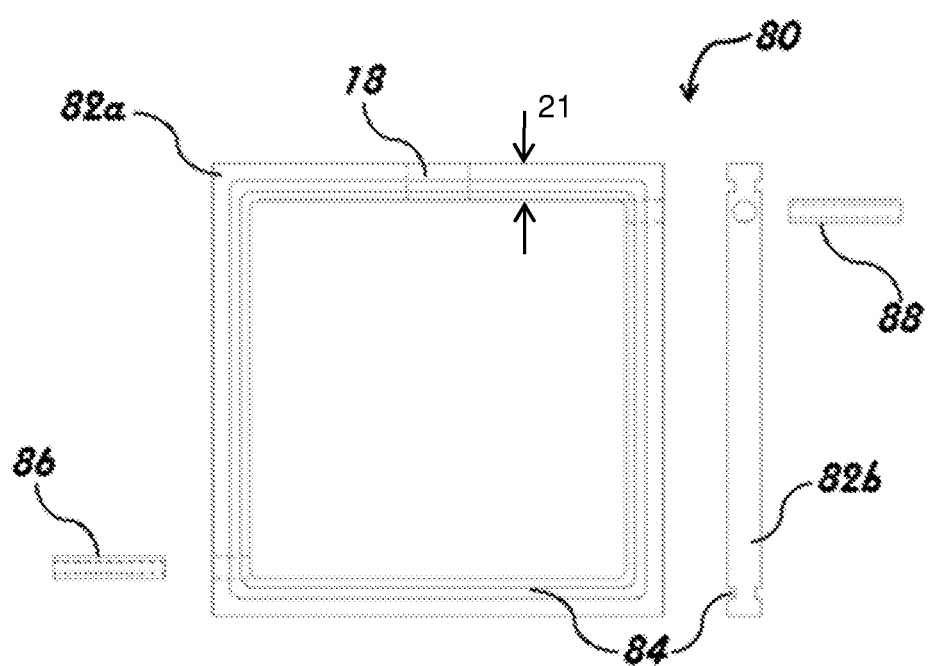
FIG. 3 shows side views and respective end views of an exemplary plenum frame for a three-electrode battery cell, in accordance with embodiments of the invention.

In an embodiment of the present invention, there is provided a design of plenum frames. FIG. 2 and FIG. 3 show side views and end views of an exemplary plenum frame 20, 80 for a two-electrode and a three-electrode battery cell respectively. Annular recesses 24, 84 can be provided on both sides of the plenum frame 24, 84 to receive O-rings 38, as shown in FIGS. 2 and 3. In further embodiments, the width 21 and thickness of plenum frames 20, 80 can range from 2 mm to 8 mm and from 1 mm to 10 mm, respectively. In yet a further embodiment, an inlet 26, 86 and an outlet 28, 80 are attached to the frame 20, 80 at the positions with openings for the injection and extraction of an aqueous electrolyte. In yet another embodiment, as shown in FIG. 3, there is provided a slot opening 18 on a side of the plenum frame 80 (with the annular recesses 84 for O-ring 38 and the inlet 86/outlet 88 for electrolyte injection/extraction). The slot opening is used for the insertion of a third electrode 32 (also known as an auxiliary electrode), for the case of battery stack in three-electrode configuration (see FIG. 15).

In a further embodiment, the plenum frames may include light-weight yet tough materials, which may be, but not limited to, polyethylene (PE), polypropylene (PP), polystyrene (PS), acrylonitrile butadiene styrene (ABS), polyethylene terephthalate (PET), polyamides (PA), polytetrafluoroethylene (PTFE), polyvinyl chloride (PVC), polyvinylidene chloride (PVDC) or any other plastic materials or combinations thereof.

The Bipolar Plate

Figure 4:
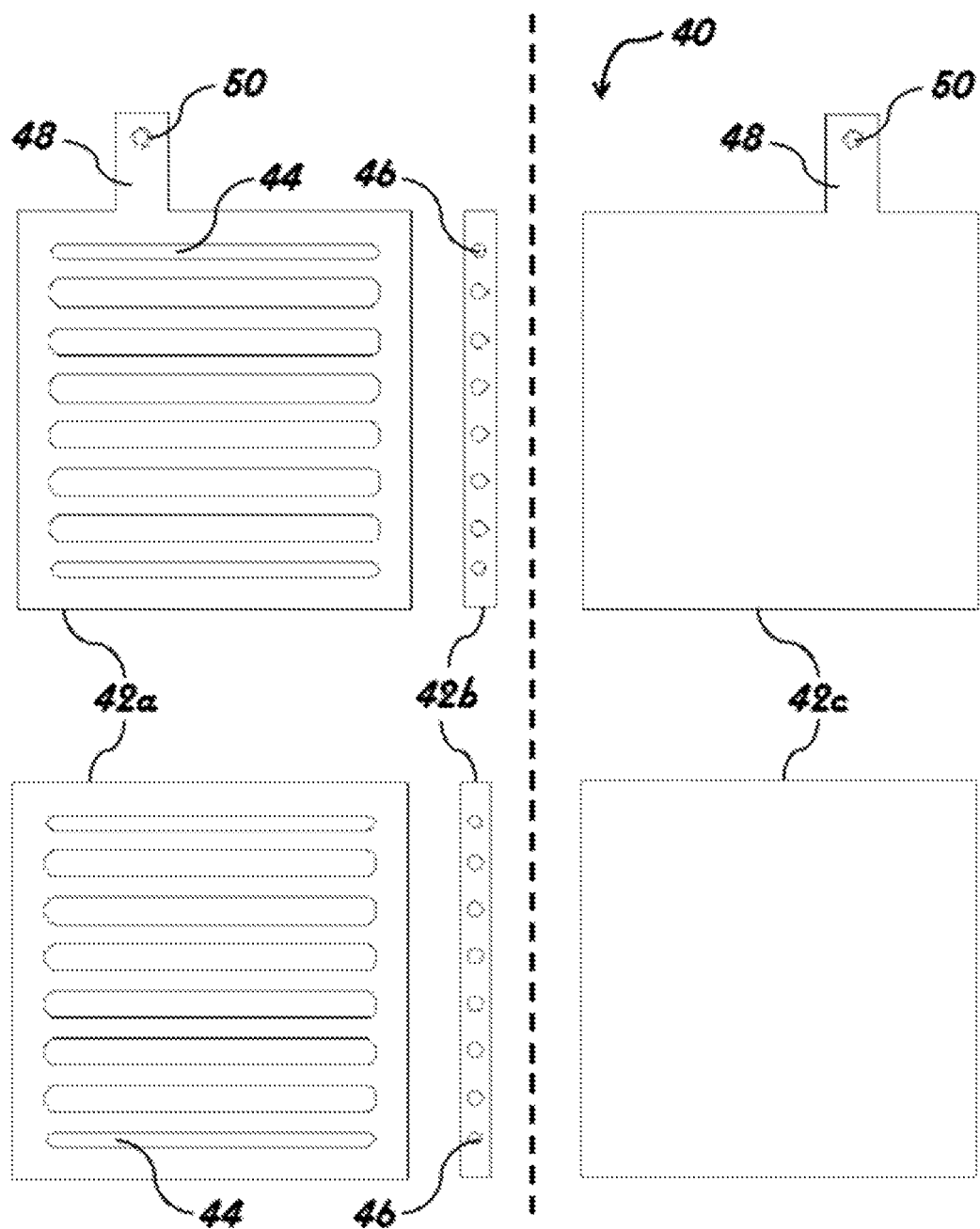
FIG. 4 shows side views and respective end views of an exemplary bipolar plate with an optional feature of a protruded current collection terminal, in accordance with embodiments of the invention.

In a further embodiment there is provided a design of bipolar plate. The bipolar plate in accordance with embodiments of the present invention generally include a first major surface configured to abut a metal anode of an adjacent cell, and a second major surface comprising a plurality of first grooves. FIG. 4 shows an embodiment of the bipolar plate 40 with view 42a of the second major surface, side view 42b and view 42c of the first major surface. The second major surface (shown in view 42a) is engraved to form air channels 44 and holes 46 are made at the side to connect these air channels. In other words, the bipolar plate includes an edge surface (shown in side view 42b) which comprises a plurality of holes 46 which are in fluid communication with the plurality of first grooves to form air channels 44. The pattern of air channels 44 is not especially limited as long as the air can reach air cathodes after the battery assembly. Examples of patterns of the air channels include, but not limited to, lines, zig-zag, spiral, waves and labyrinth. In some embodiments, the depth of air channels 44 ranges from 0.1 to 2 mm. It is also optional to have a protruded flag 48 with screw hole 50 drilled through to facilitate connection to external circuit. The first major surface of the bipolar plate 40 (shown in view 42c) is configured to abut a corresponding metal anode of an adjacent battery cell when assembled, while the second major surface (shown in view 42a) of the bipolar plate 40, having a plurality of air channels 44 defined thereon, is configured to abut an air cathode of the battery cell, such that the air cathode is in fluid communication with the plurality of air channels of the bipolar plate 40.

Figure 5:
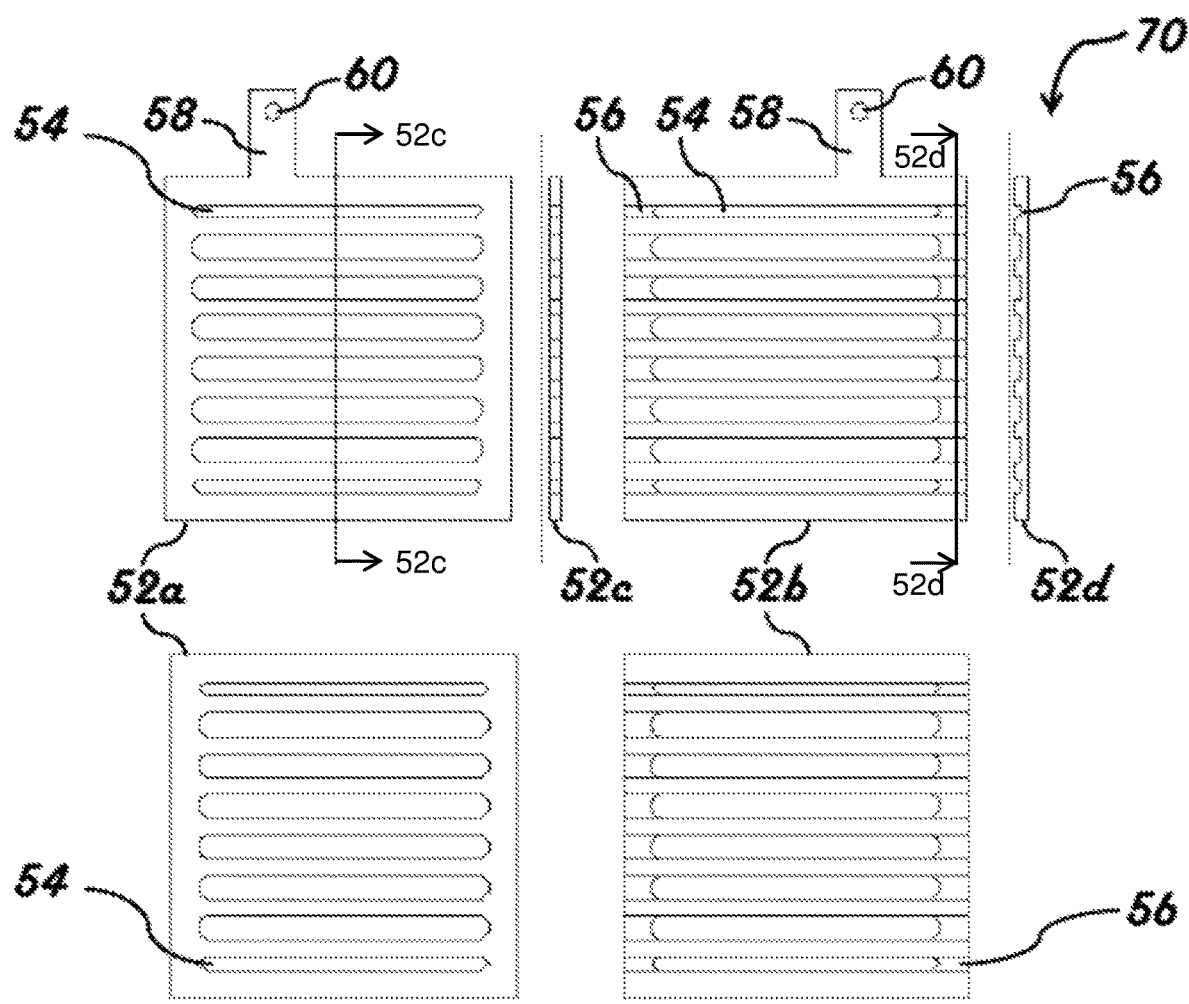
FIG. 5 shows side views and respective end views of another exemplary bipolar plate with an optional feature of a protruded current collection terminal, in accordance with embodiments of the invention.

FIG. 5 shows yet another embodiment of a bipolar plate 70 with view 52a of the second major surface, view 52b of the first major surface, and the selected cross-sectional views 52c and 52d. The second major surface (shown in view 52a and sectional view 52c) is engraved to form air channels 54 that can have a depth equal to half of the bipolar plate thickness. The second major surface of the bipolar plate 70 is configured to abut an air cathode of the battery cell. The first major surface (shown in views 52b and 52d) is configured to abut a metal anode of an adjacent cell. The first major surface of the bipolar plate 70 can also be engraved to form openings 56 across the bipolar plate, that are in alignment with the air channels 54 and also to the depth equal to half of the bipolar plate thickness, so that each opening interconnects with its corresponding air channel. In other words, the first major surface of the bipolar plate 70 comprises a plurality of second grooves 56 extending across the bipolar plate 70 and being in fluid communication with first grooves for forming the air channels 54. It is also optional to have a protruded flag 58 with screw hole 60 drilled through to facilitate connection to external circuit.

In various embodiments of the present invention, the bipolar plates are made from light-weight yet tough materials, which may be, but not limited to, electrochemically inert metals (e.g. nickel, copper, stainless steel and titanium), inert metal-coated light-weight materials (e.g. nickel-coated aluminum alloy, silver-coated aluminum alloy, nickel-coated plastic, silver-coated plastic), graphite and glassy carbon.

The Air Cathode and Optional Auxiliary Electrode

In various embodiments of the present invention, the air cathode 30 can include at least one current collector (also known as a current collection terminal), a catalyst and an air permeable hydrophobic layer. The air cathode 30 can be in the forms of, but not limited to, sintered aggregates on inert matrix (e.g. catalyst-binder-carbon hot pressed on nickel mesh), catalyst-grown (gas diffusion layer) GDL, and catalyst-loaded GDL. In exemplary embodiments, the GDL can be a carbon fiber-based nonwoven fabric (e.g. commercial product 10BC supplied by SGL Carbon). In a further embodiment, an auxiliary electrode 32 can be introduced or disposed within the plenum frame 80 (see FIG. 12). The auxiliary electrode 32 may be in the forms of, but not limited to, perforated metallic sheets, metallic meshes, metallic foams, catalyst-grown metallic sheets, catalyst-grown metallic meshes, and catalyst-grown metallic foams. The metals can be any metals or alloys that can withstand the highly oxidative environment during the charging stage of metal-air cells. Such metals can be, but not limited to, nickel, titanium, stainless steel, and silver. In an embodiment, the metal is nickel.

The Battery Assembly with Two-Electrode Design

A further embodiment of the invention is directed to the design and manufacturing of metal-air battery stack in two-electrode configuration, which utilizes a single pair of ports for charging and discharging. Such a battery stack comprises metal anodes, bifunctional air cathodes, and an aqueous electrolyte. Herein the catalysts applied to the air cathodes 30 are bifunctional, meaning that they are active for both the oxygen reduction reaction (ORR) and the oxygen evolution reaction (OER). Such bifunctional catalysts include, but not limited to, cobalt oxides where cobalt has an oxidation states from +2 to +3, manganese oxides where manganese ha an oxidation states from +2 to +4, binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, perovskite oxides containing lanthanide, rare earth metals and first-row transition metals, platinum-carbon, ruthenium oxide-carbon, nitrogen-doped carbon, boron-doped carbon, phosphorous-doped carbon, iron-carbon, cobalt-carbon, and iron-cobalt-carbon.

Figure 6:
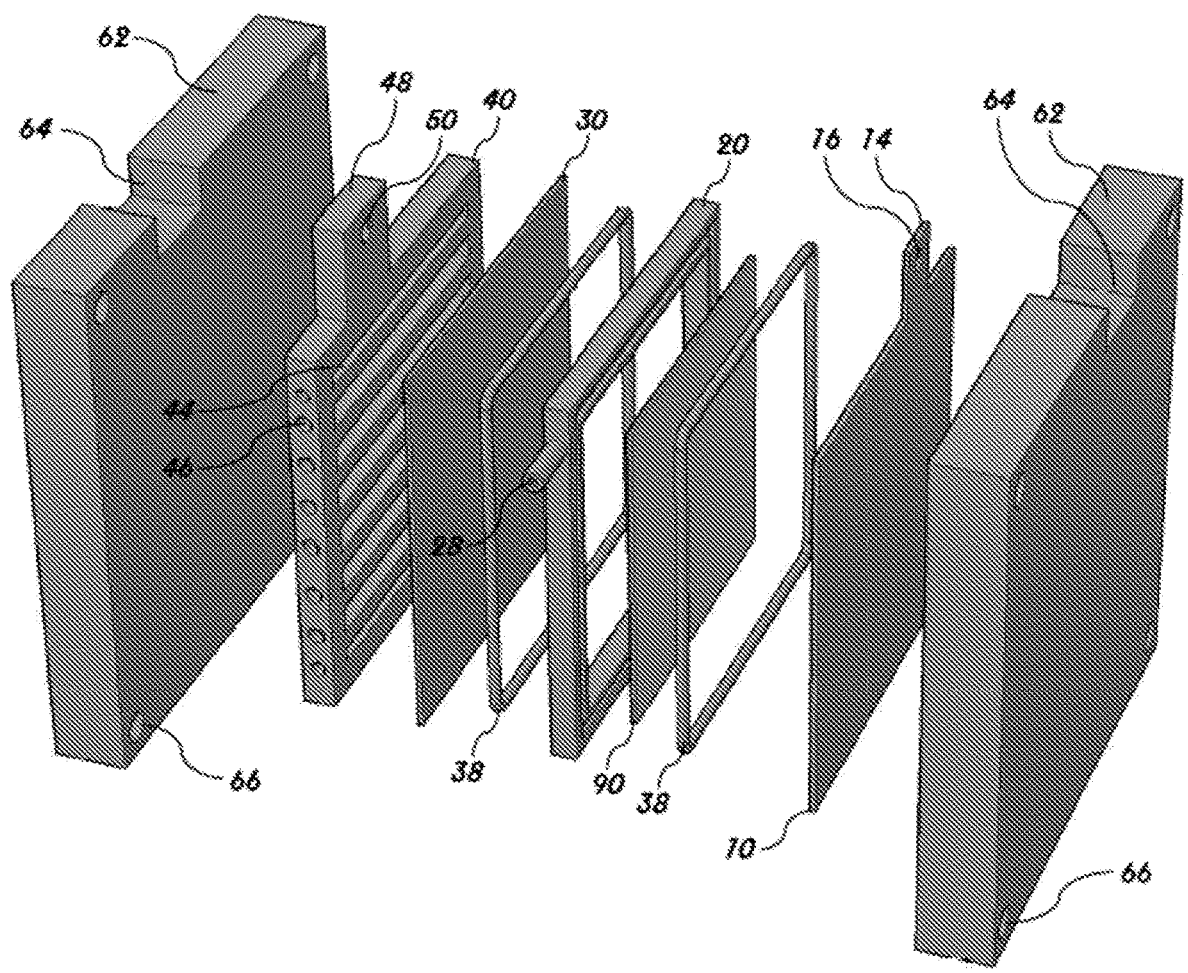
FIG. 6 shows an exploded view of a single-cell air-metal battery of a two-electrode design with bipolar plate of FIG. 4, in accordance with an embodiment of the invention.
Figure 7:
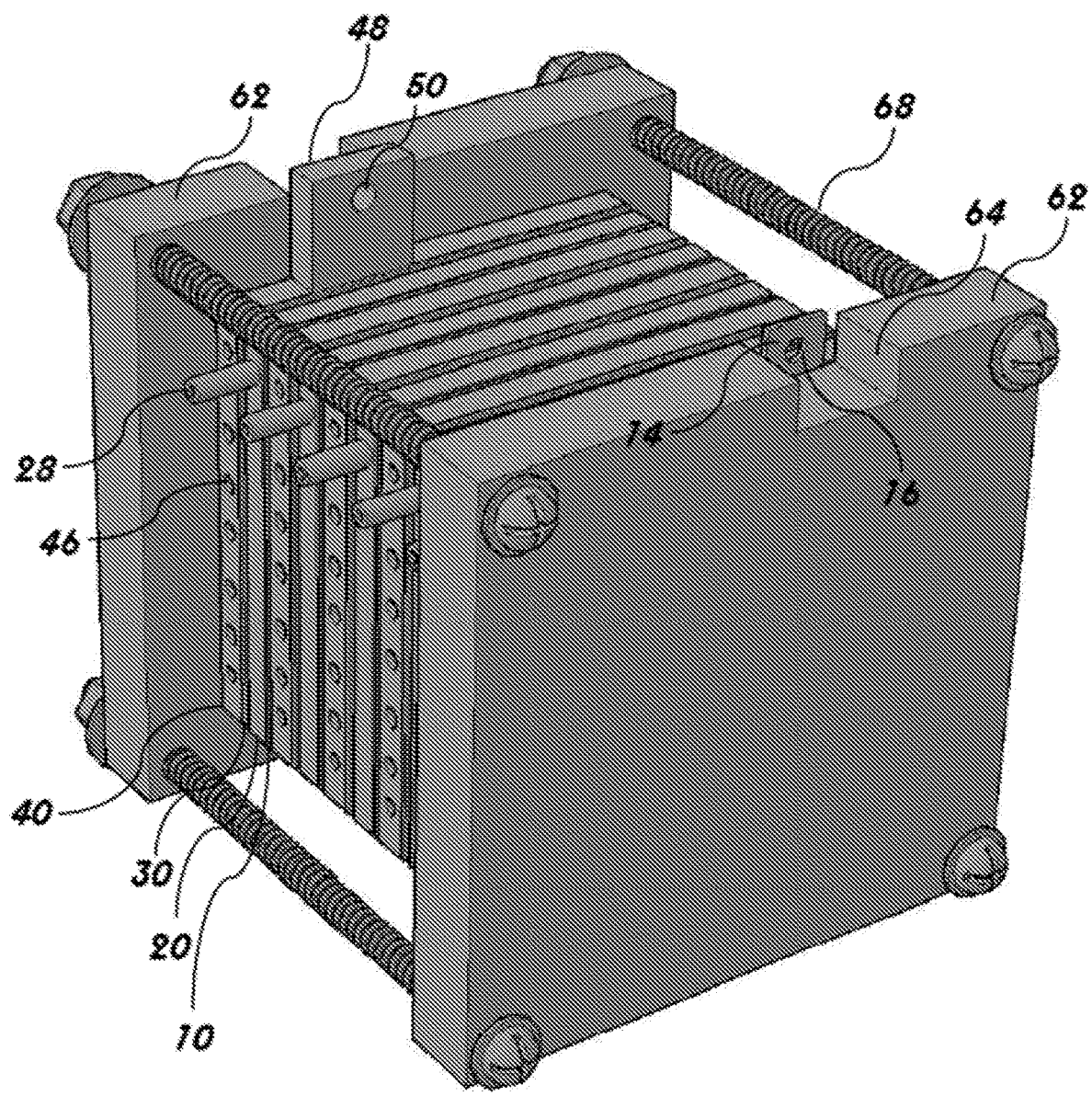
FIG. 7 shows an assembled view of a metal-air battery stack comprising a plurality of metal-air battery cells of two-electrode design with bipolar plates of FIG. 4, in accordance with embodiments of the invention.
Figure 8:
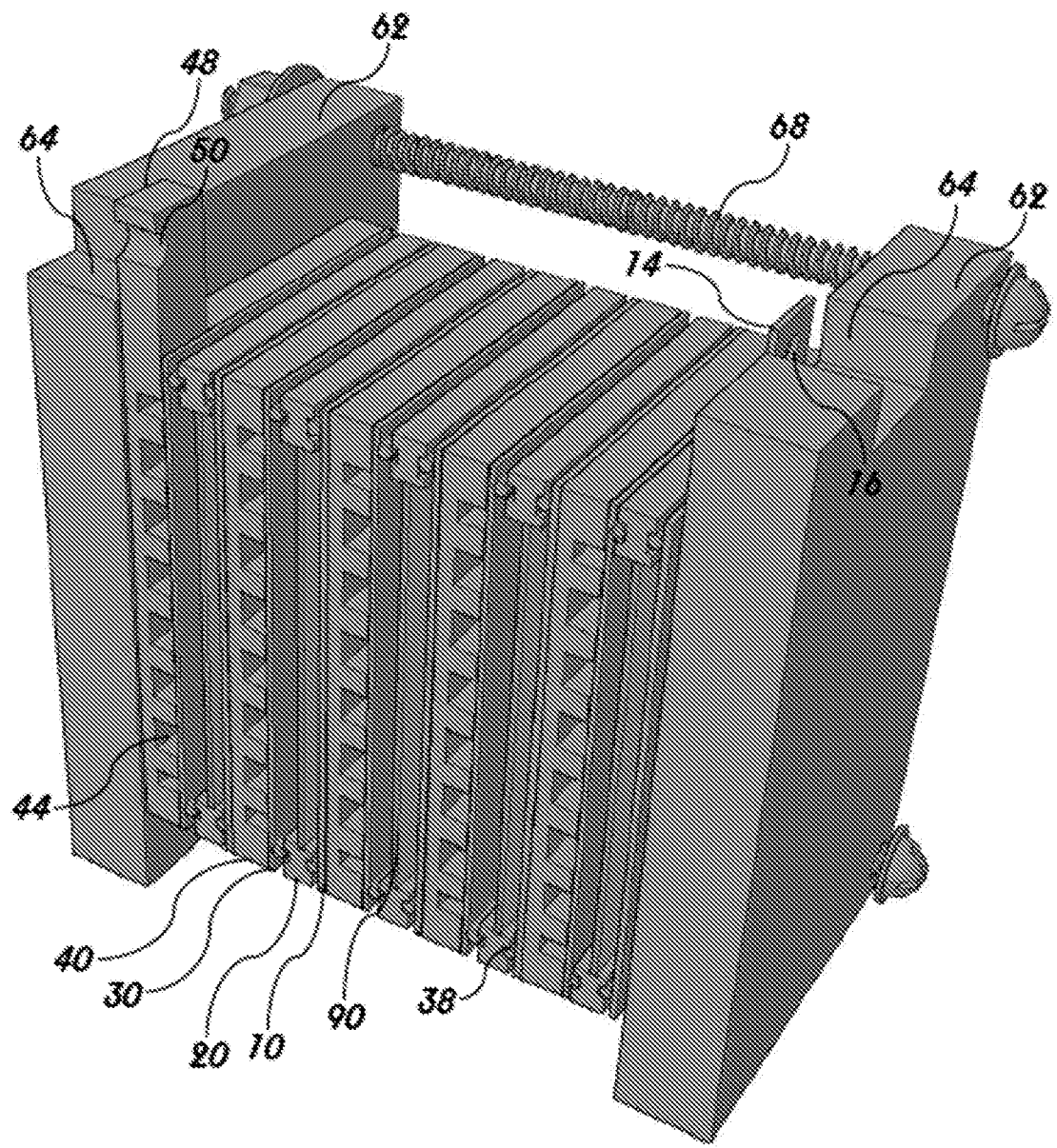
FIG. 8 shows a sectional view of the metal-air battery stack of FIG. 7.
Figure 9:
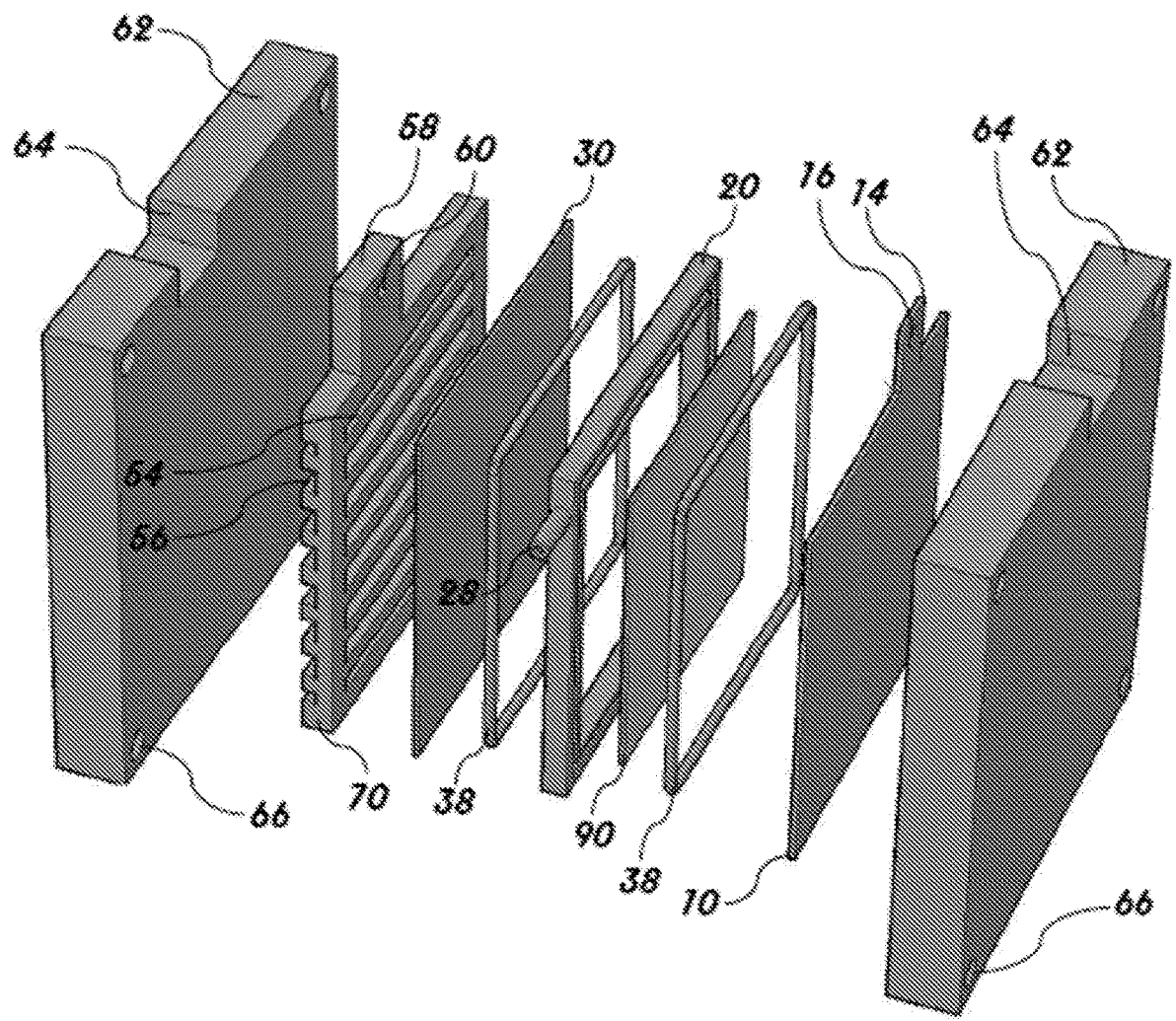
FIG. 9 shows an exploded view of a single-cell air-metal battery of a two-electrode design with bipolar plate of FIG. 5, in accordance with another embodiment of the invention.
Figure 10:
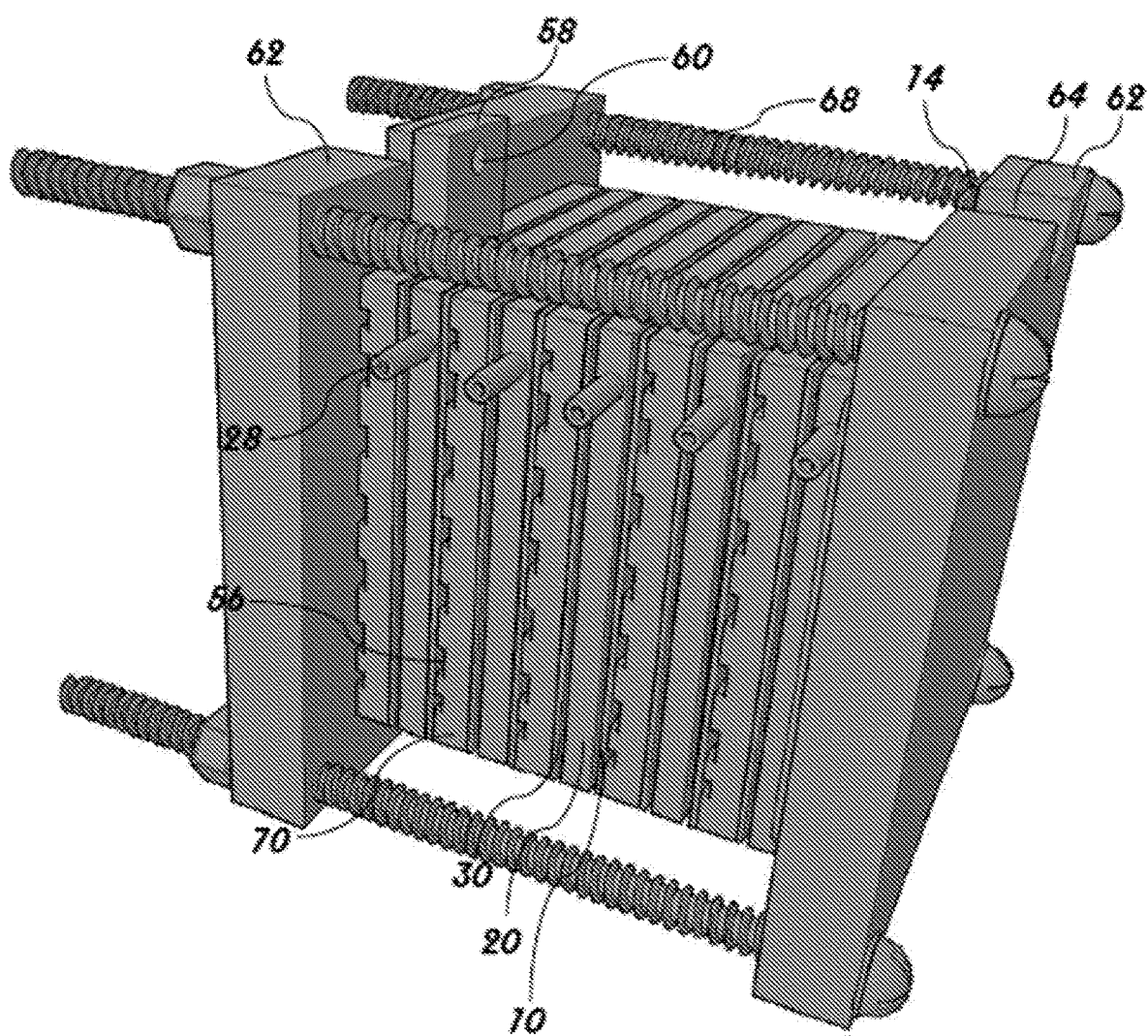
FIG. 10 shows an assembled view of a metal-air battery stack comprising a plurality of metal-air battery cells of two-electrode design with bipolar plates of FIG. 5, in accordance with embodiments of the invention.
Figure 11:
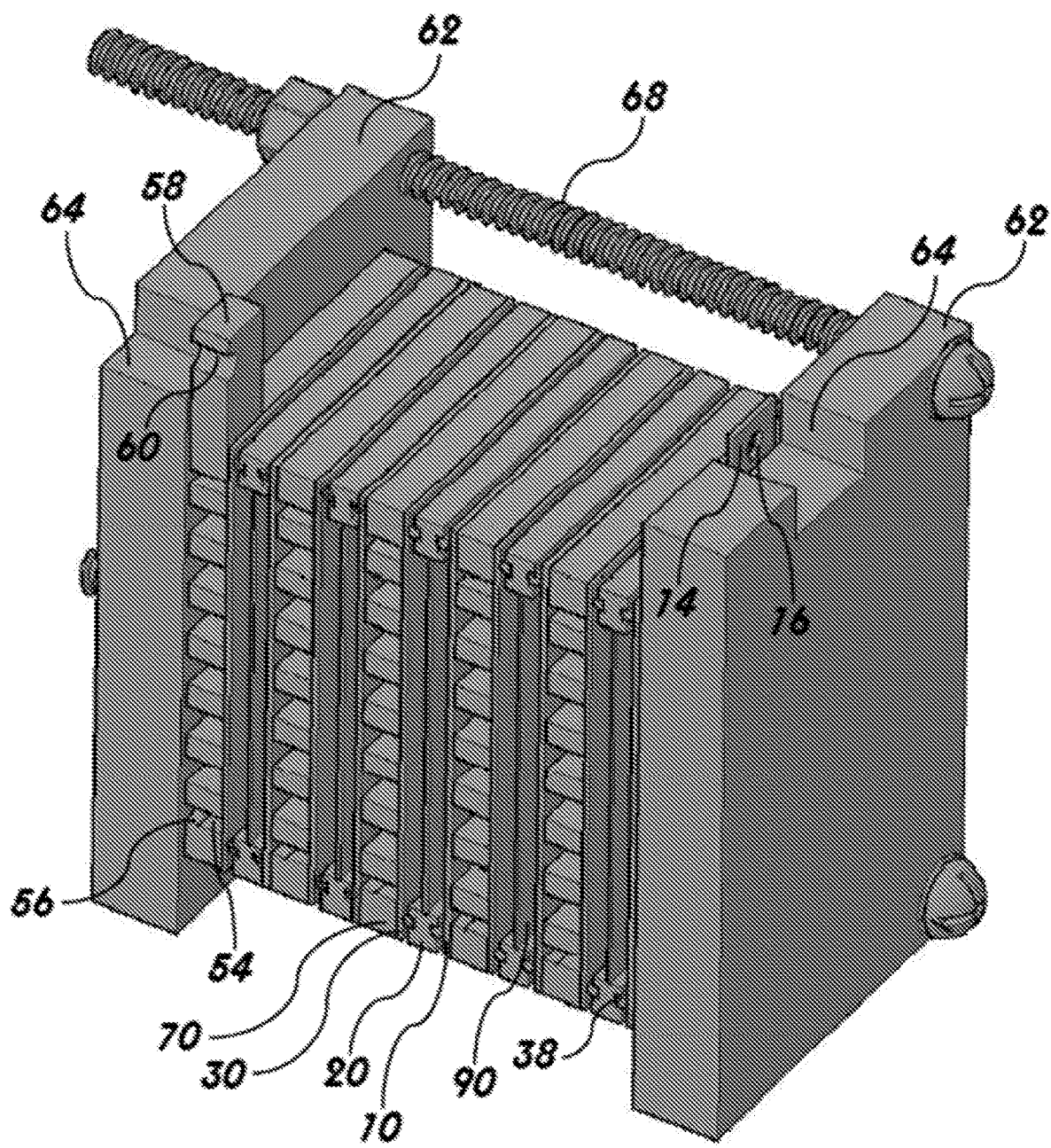
FIG. 11 shows a sectional view of the metal-air battery stack of FIG. 10.

FIG. 6 shows an exploded view of a single-cell air-metal battery of a two-electrode design with bipolar plate 40 of FIG. 4. FIG. 7 shows the assembled view of an embodiment of the two-electrode battery stack that comprises of five single cells each including the bipolar plate 40 of FIG. 4, and FIG. 8 shows sectional view of the battery stack of FIG. 8. It is noted that only the outmost metal anode (and bipolar plate) includes protruded flags (also known as current collection terminals) 14 (and 48) for the ease of connection to external circuit. FIG. 9 shows an exploded view of a single cell with the two-electrode design with bipolar plate 70 of FIG. 5. FIG. 10 shows the assembled view of an embodiment of the two-electrode battery stack that comprises of five single cells each including the bipolar plate of FIG. 5. FIG. 11 shows sectional view of the battery stack of FIG. 10.

In various embodiments of the present invention, as shown in FIGS. 6 to 11, the battery stack can include at least one rechargeable metal-air battery cell. Each of the at least one rechargeable metal-air battery cell includes a bipolar plate 40, 70 defining a plurality of air channels, an air cathode 30 abutting the bipolar plate 40, 70 such that the air cathode 30 is in fluid communication with the air channels, a plenum frame 20 comprising a first major surface and a second major surface opposite the first major surface, wherein the air cathode 30 is adjacent the first major surface and a metal anode 10 adjacent the second major surface of the plenum frame 20. The bipolar plate 40, 70 of each of the at least one battery cell 10 is configured to abut a corresponding metal anode 10 of an adjacent battery cell to provide electrical connection with said adjacent cell. In various embodiments of the present invention, the battery stack can further include a first end plate and a second end plate 62, and the at least one rechargeable metal-air battery cell can be disposed between the first and the second end plates 62. As will be described in detail below, the battery stack can further include a compression device (e.g. screw fastening mechanism) configured to act on the first and the second end plates to exert a compressive force on the at least one rechargeable metal-air battery cell.

The Battery Assembly with Three-Electrode Design

Yet a further embodiment of the invention is directed to the design and manufacturing of metal-air battery stack in a three-electrode configuration, which utilizes two pairs of ports for separate charging and discharging. Such a battery stack comprises metal anodes, air cathodes, auxiliary electrodes, and an aqueous electrolyte. In other words, the auxiliary electrodes are configured for charging of the battery stack, while the air cathodes are configured for discharging of the battery stack. In a further embodiment of the invention, the three-electrode battery is configured such that the auxiliary electrode is located between the anode and the cathode. In yet another further embodiment of the invention, the metal anode is located between the air cathode and the auxiliary electrode.

For battery stacks with the three-electrode design, the catalysts applied to the air cathodes 30 are solely for the ORR during the discharge stage. Such ORR catalysts include, but not limited to, cobalt oxides where cobalt has oxidation states from +2 to +3, manganese oxides where manganese has oxidation states from +2 to +4, binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, perovskite oxides containing lanthanide, rare earth metals and first-row transition metals, platinum-carbon, platinum alloys-carbon, nitrogen-doped carbon, boron-doped carbon, phosphorous-doped carbon, iron-carbon, cobalt-carbon, and iron-cobalt-carbon.

Similarly, the catalysts applied to auxiliary electrode 32 are solely for the OER. Such OER catalysts include, but not limited to, ruthenium oxides, metallic ruthenium, metallic iridium, iridium oxides, cobalt oxides where cobalt has an oxidation states from +2 to +3, binary cobalt-manganese binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, and perovskite oxides containing lanthanide, rare earth metals and first-row transition metals. In an alternate embodiment, auxiliary electrodes are free of carbons and binders, which would degrade under the severely oxidative environment during the operation of battery.

Figure 12:
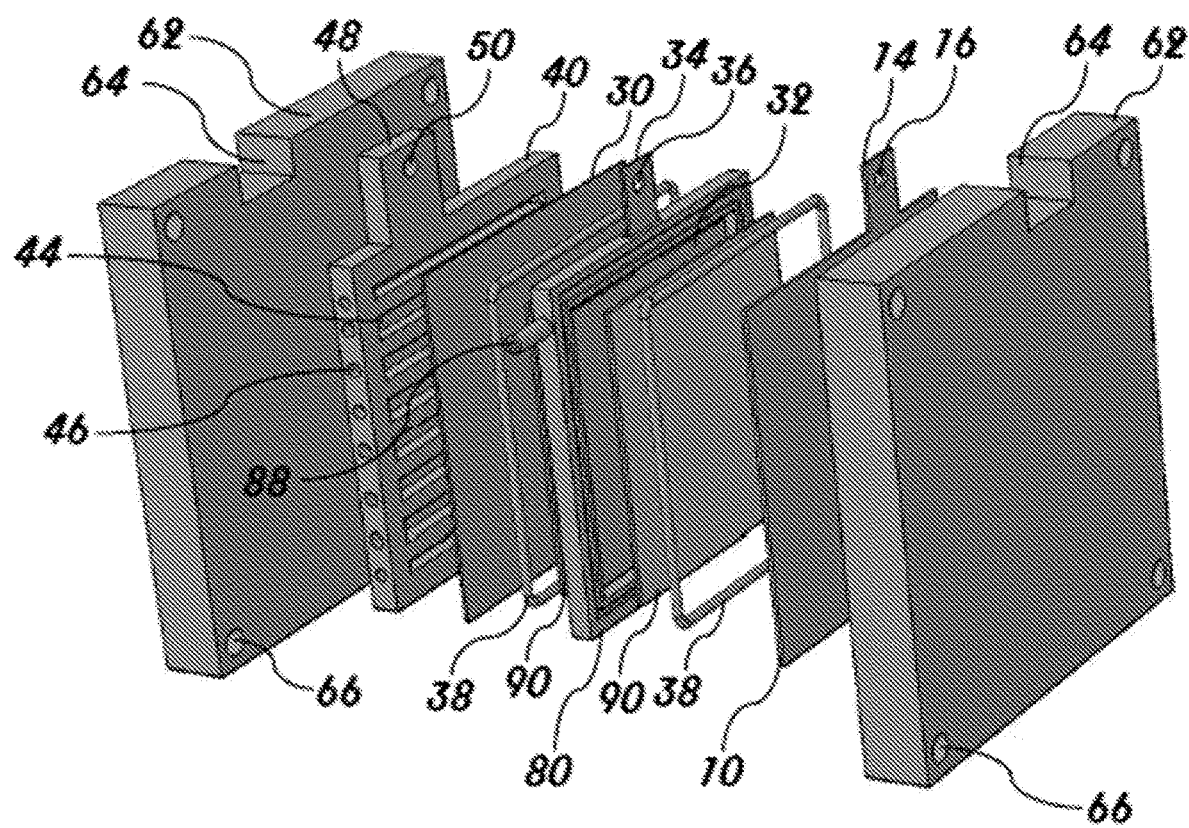
FIG. 12 shows an exploded view of a single-cell air-metal battery of a three-electrode design with bipolar plate of FIG. 4, in accordance with an embodiment of the invention.
Figure 13:
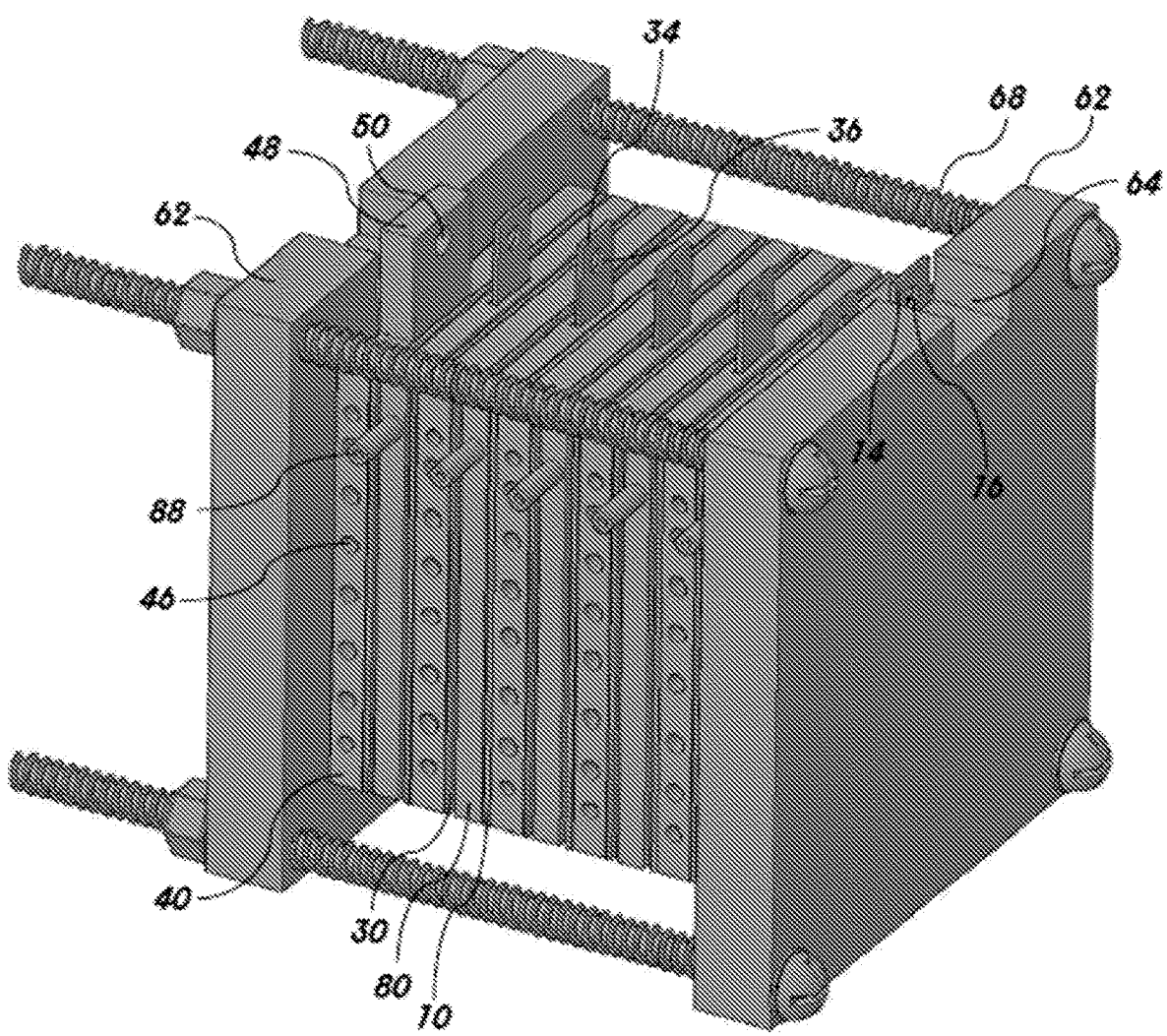
FIG. 13 shows an assembled view of a metal-air battery stack comprising a plurality of metal-air battery cells of three-electrode design with bipolar plates of FIG. 4, in accordance with embodiments of the invention.
Figure 14:
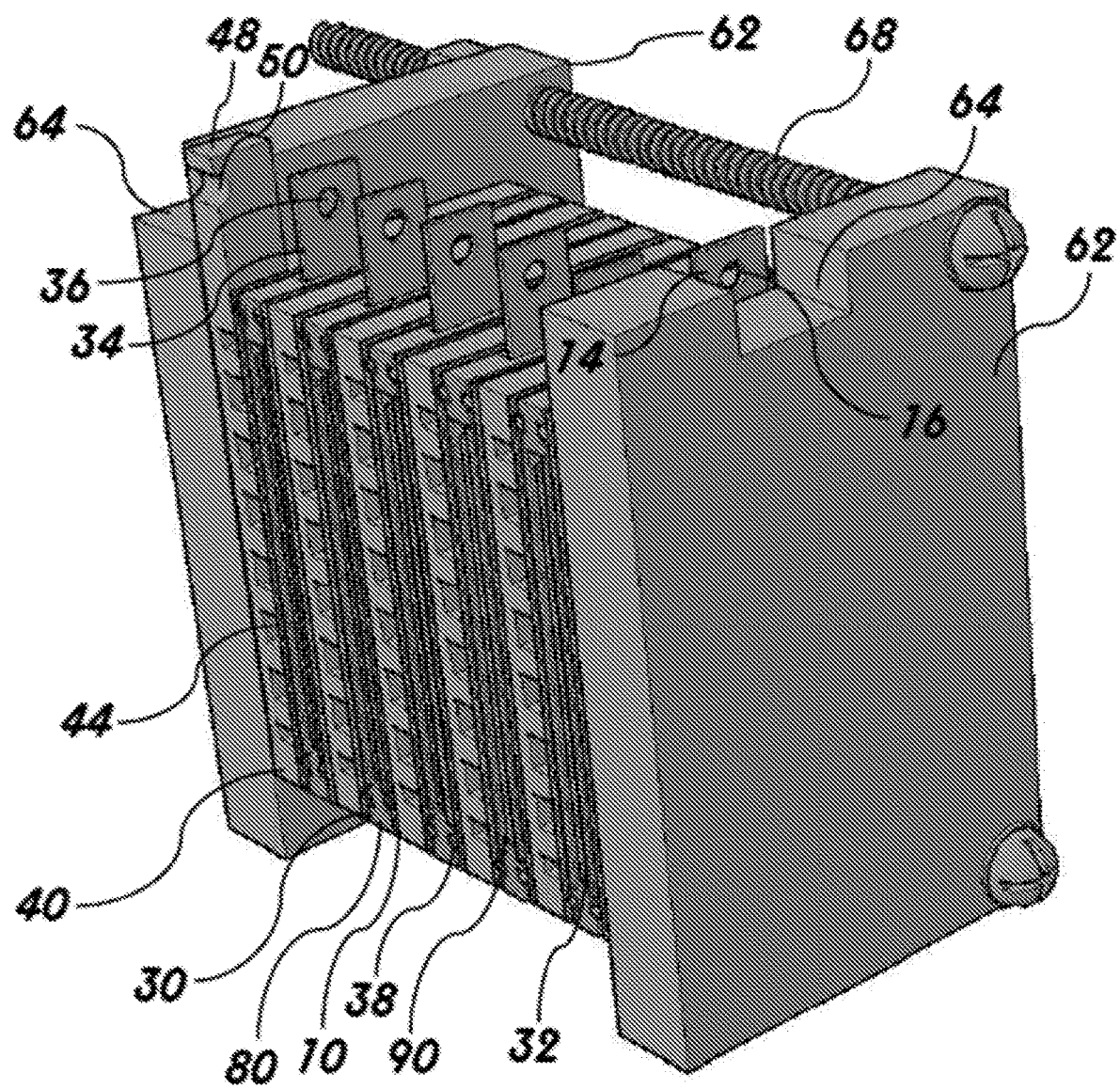
FIG. 14 shows a sectional view of the metal-air battery stack of FIG. 13.
Figure 15:
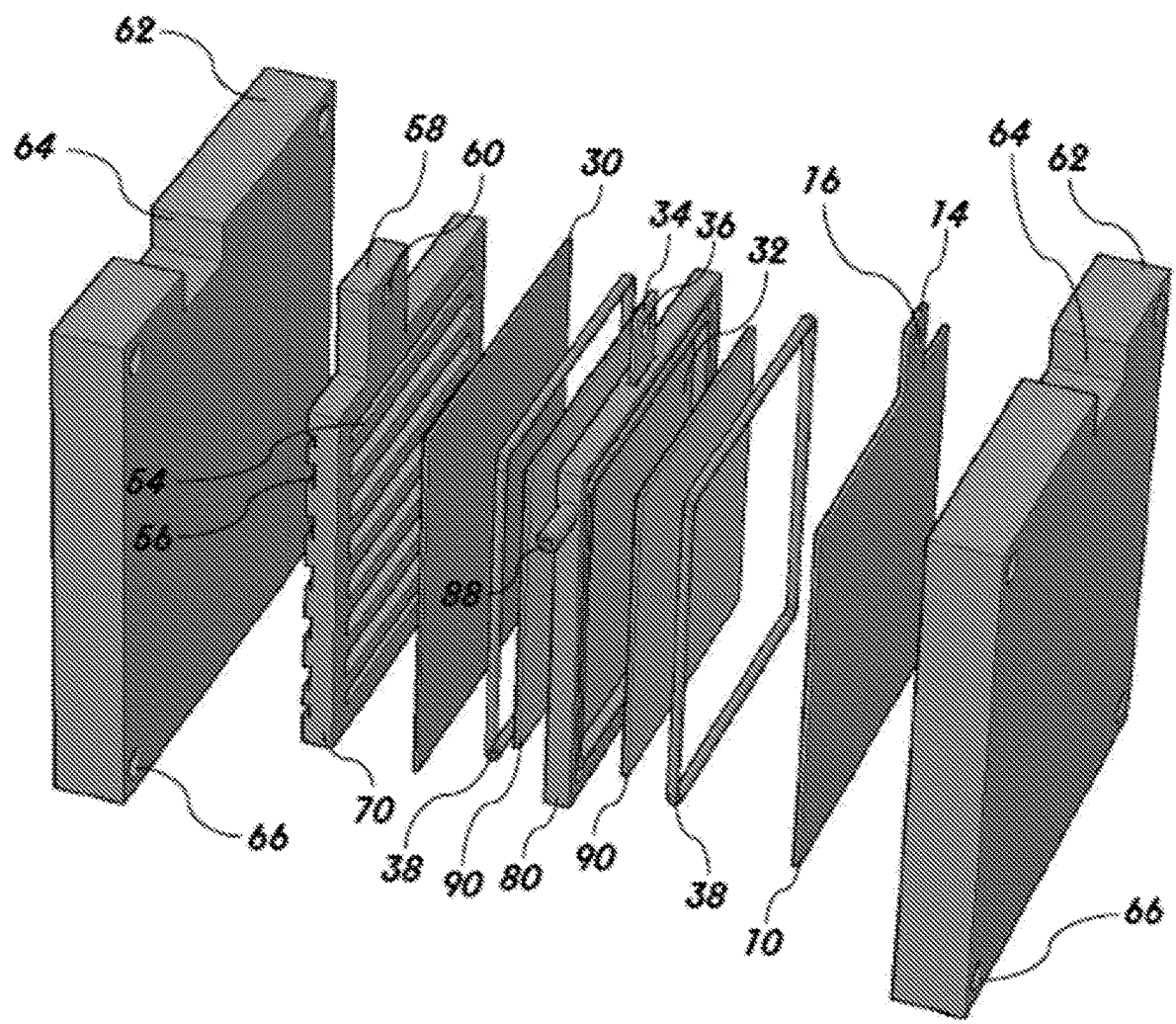
FIG. 15 shows an exploded view of a single-cell air-metal battery of a three-electrode design with bipolar plate of FIG. 5, in accordance with another embodiment of the invention.
Figure 16:
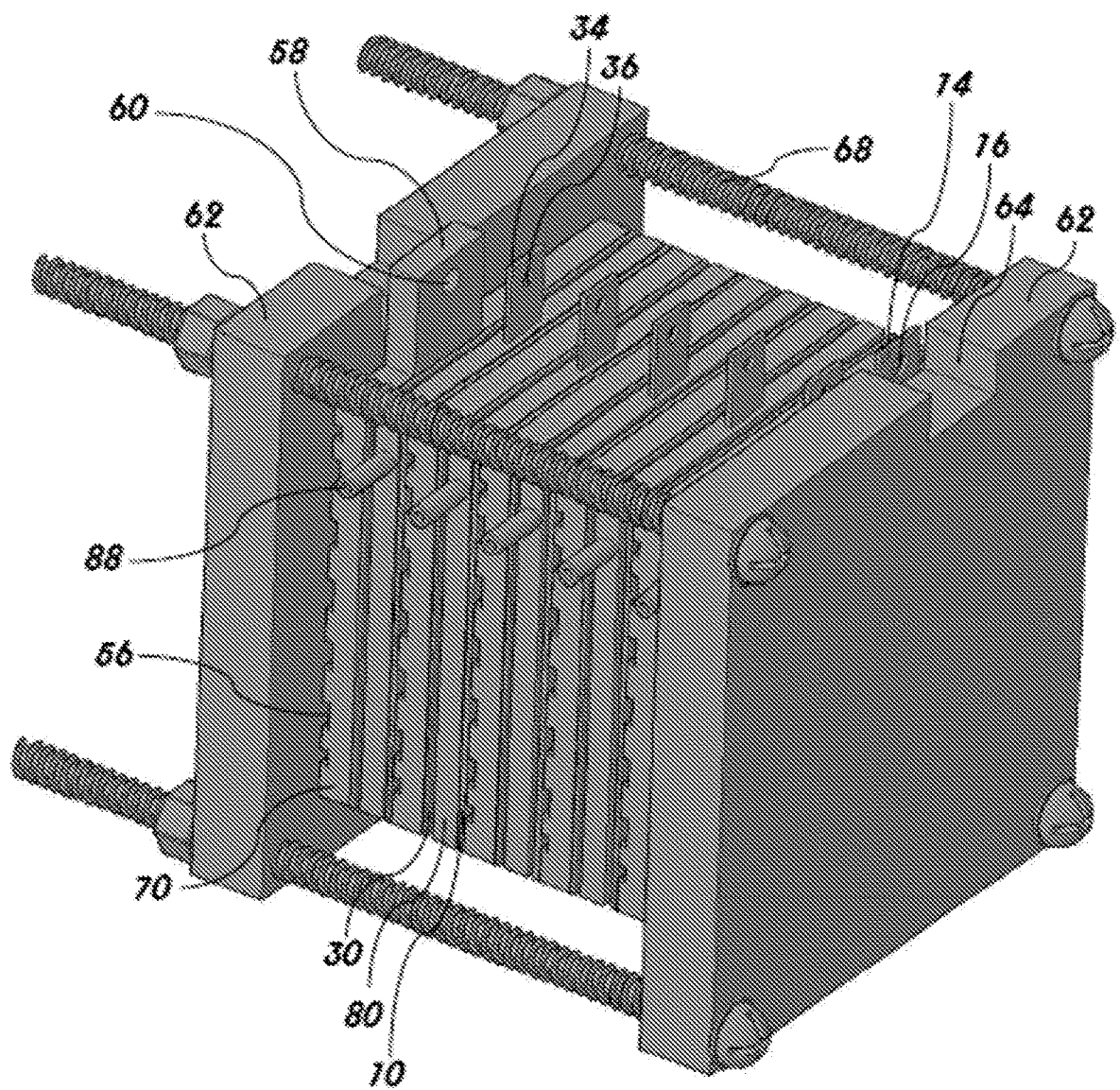
FIG. 16 shows an assembled view of a metal-air battery stack comprising a plurality of metal-air battery cells of three-electrode design with bipolar plates of FIG. 5, in accordance with embodiments of the invention.
Figure 17:
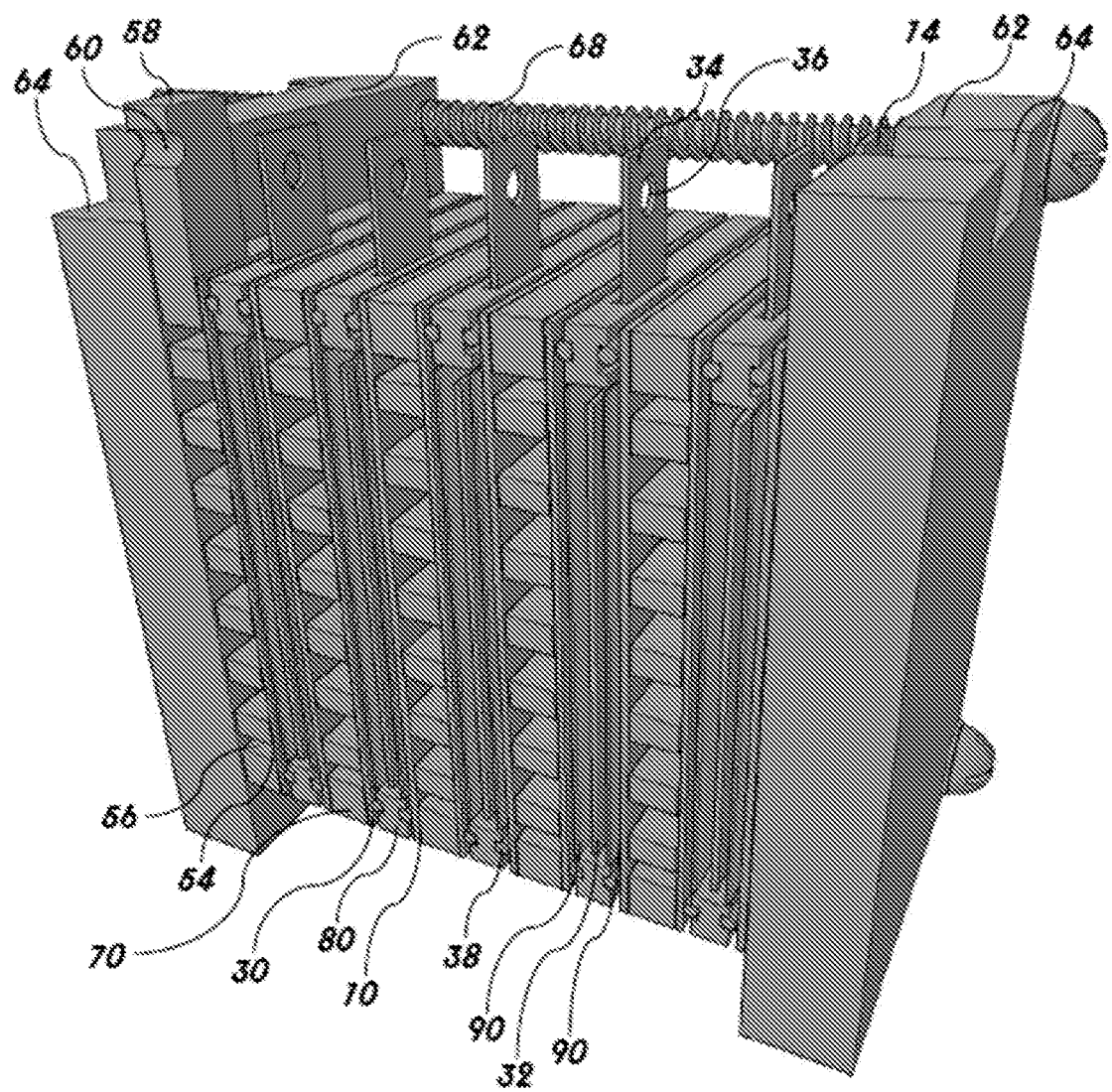
FIG. 17 shows a sectional view of the metal-air battery stack of FIG. 16.

FIG. 12 shows the exploded view of a single cell with a three-electrode design, which, in addition to the features of the two-electrode design, also comprises an auxiliary electrode 32 with corresponding protruded flag 34 and screw hole 36. The bipolar plate 40 is one shown in FIG. 4. FIG. 13 shows the assembled view of an embodiment of a three-electrode battery stack that comprises of five single cells with the bipolar plate design shown in FIG. 4, and FIG. 14 shows the sectional view of such battery stack. FIG. 15 shows the exploded view of a single cell with the three-electrode design and bipolar plate 70, similar to that shown in FIG. 5. FIGS. 16 and 17 respectively show the assembled view and sectional view of an embodiment of the three-electrode battery stack that comprises of five single cells with bipolar plate design of FIG. 5. It should be noted that, while only the outmost metal anode (and bipolar plate) have the protruded flag 14 (and 48), each auxiliary electrode can have the protruded flag 34 for the ease of connection to external circuit.

Other Aspects of the Battery Assembly

In a further embodiment of the battery assembly, end plates are utilized to assemble the battery stack into a planar and bipolar configuration. In various embodiments of the present invention, the end plates 62 and the one or more battery cells disposed therebetween are compressed using a compressive device. The compressive device can be a screw fastening compression mechanism, which comprises one screw hole 66 at each corner to enable the application of fastening screws 68, and engraved features 64 at positions in accordance with the protruded flags 14 and 48, respectively. Such end plates are made from light-weight yet tough materials, which may be, but not limited to, rigid metallic plates coated with electrically isolating layers (e.g. polyethylene coated high-carbon steels, painted stainless steels), a two-layer structure consisting of plastic plates and metallic plates.

In a further embodiment, as shown in FIGS. 6-17, a porous separator 90 of the same shape and size of the central opening of the frame is applied inside the frame for the two-electrode design and two such separators are applied (one at each side) inside the frame for the three-electrode design, in order to prevent the direct contact between the electrodes. The porous separator 90 is not especially limited as long as being an insulating and corrosive-resistant material allowing the movement of an electrolyte, such as non-woven fabrics and porous membrane made of resins such as polyolefin and fluororesin. Examples of the resin include, but not limited to, polypropylene, polyethylene, hydrophilized PTFE, and hydrophilized polyvinylidene fluoride (PVDF). In an exemplary embodiment, the separator is Zirfon Perl supplied by Agfa. In yet a further embodiment of the invention, no separator is employed in battery stack of two-electrode configuration. The zinc anodes and air cathodes are isolated by a plenum chamber that accommodates liquid electrolyte. The cost of battery stack can be advantageously reduced by eliminating the separator, as most battery separators are expensive.

In a further embodiment of the invention, the electrolyte is alkaline solutions with concentrations ranging from 10 wt. % to 50 wt. %. The alkaline solutions can be, but not limited to, potassium hydroxide, sodium hydroxide, lithium hydroxide, and barium hydroxide. In some embodiments, zinc sources are incorporated into the alkaline solutions for zinc-air batteries. Zinc sources can be, but not limited to, zinc oxide, zinc acetate, zinc nitrate, zinc chloride, zinc sulfate, zinc acrylate, zinc diethyldithiocarbamate, and zinc methacrylate. In an exemplary embodiment, the zinc source is zinc acetate.

In a further embodiment of the invention the metal-air battery stack is operated with an aqueous electrolyte circulated using an electrolyte management system. In various embodiments of the present invention, the electrolyte management system is fluidly connected to each inlet and outlet end of each rechargeable cell to circulate aqueous electrolyte through the plenum frames of the cells. The electrolyte management system can comprise a peristaltic pump, a syringe pump, inlet pipes, outlet pipes, a reservoir, and mechanisms inter-connecting multiple cells. The electrolyte flow is maintained by a peristaltic pump. The quality of electrolyte in the reservoir is managed by a syringe pump which can inject and withdraw electrolyte. Materials for pipes and the reservoir preferably comprise insulating and corrosive-resistant materials. Examples of the materials include, but not limited to, polyolefin, silicone, nylon and polyvinyl chloride. In a preferred embodiment, pipes are made from silicone. In yet another embodiment, the electrolyte can be injected into the battery stack and then both the inlet and outlet sealed.

In a further embodiment of the invention the metal-air battery stack can be air-breathing. In other words, the metal-air battery stack does not require mechanisms of air supply and air management system. The battery stack can thus be made light-weight and compact. In a further aspect of the invention the metal-air battery stack slants in the direction from the horizontal. The slant angle can be from 0° to 90°, to allow natural convection to occur. In some embodiments, the slant angle can be from 1° to 10°. In other embodiments, the slant angle is 90°, i.e. vertical.

In a further embodiment of the invention the metal-air battery stack is such assembled that no permanent connections such as glues, joining, welding, blazing, and clamping, are used. In other words, a metal-air battery stack can be easily dismantled, reused and maintained. All the mechanical components of a metal-air battery stack can be reused with almost no refurbishment cost. Thus the battery stack developed herein can be desirable for large-scale industrial applications such as grid-scale energy storage solutions.

In embodiments of the present invention, the metal-air battery stack can further include an electronic control system for regulating electrical currents. Silicon rectifiers may be used to regulate the direction of the electrical currents. The electronic control system can allow in-series battery discharging and in-parallel charging via a two-terminal port.

Figure 24:
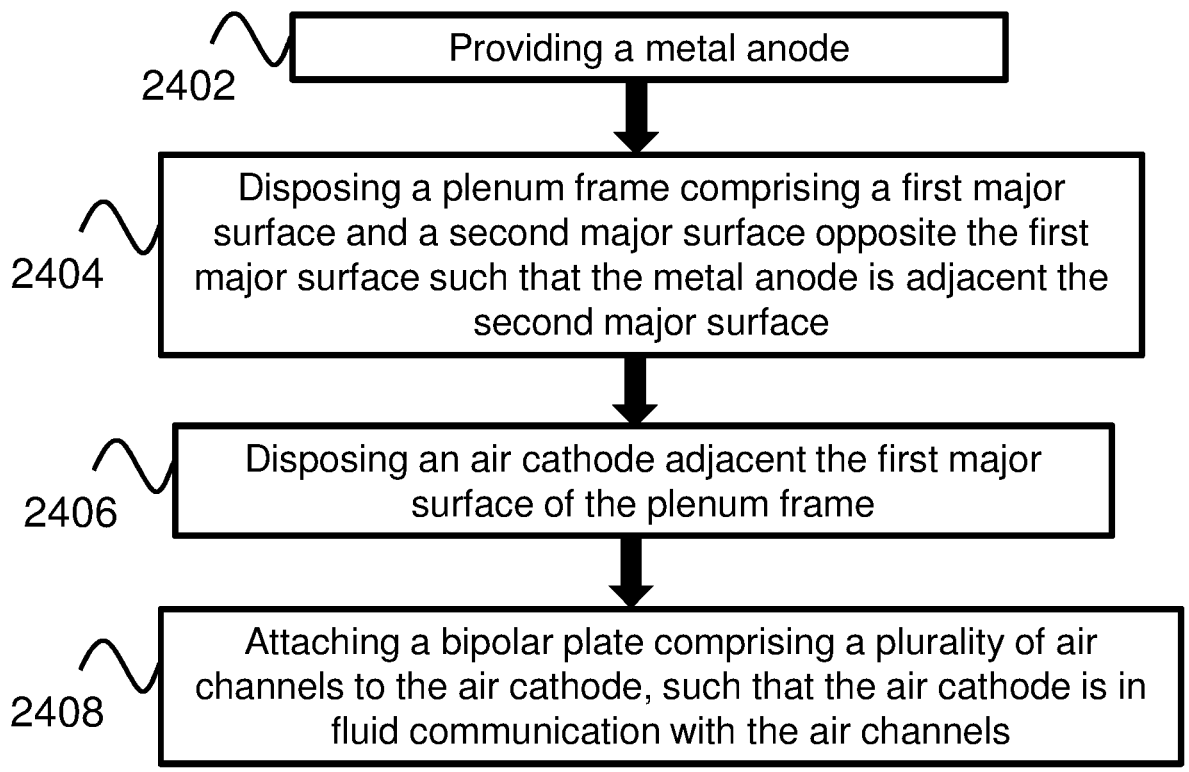
FIG. 24 shows a flowchart illustrating a method of manufacturing a rechargeable metal-air battery cell according to an example embodiment.

FIG. 24 shows a flowchart illustrating a method of manufacturing a rechargeable metal-air battery cell according to an example embodiment.

At step 2402, a metal anode is provided. At step 2404, a plenum frame is disposed on the metal cathode. The plenum frame comprises a first major surface and a second major surface opposite the first major surface such that the metal anode is adjacent the second major surface. At step 2406, an air cathode is disposed such that it is adjacent the first major surface of the plenum frame. At step 2408, a bipolar plate is attached to the air cathode. The bipolar plate comprises a plurality of air channels, and the air cathode is in fluid communication with the plurality of air channels.

Figure 25:
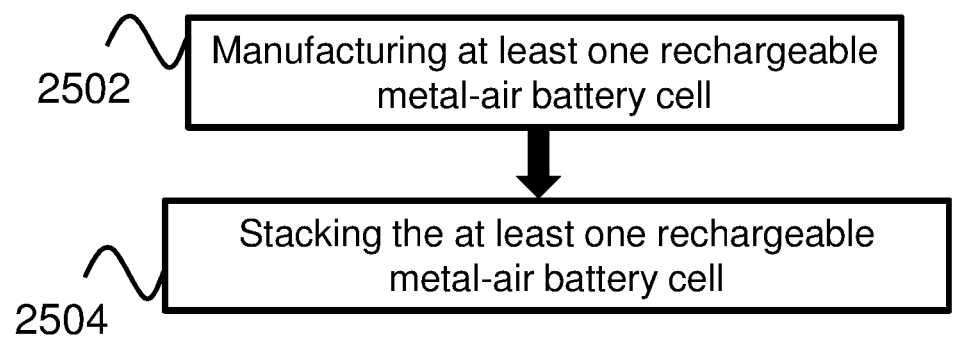
FIG. 25 shows a flowchart illustrating a method of manufacturing a rechargeable metal-air battery stack according to an example embodiment.

FIG. 25 shows a flowchart illustrating a method of manufacturing a rechargeable metal-air battery stack according to an example embodiment.

At step 2502, at least one rechargeable metal-air battery cell is manufactured. In embodiments of the present invention, the at least one rechargeable metal-air battery cell can be manufactured using the process described in the preceding steps 2402 to 2408. At step 2504, each of the at least one battery cell is stacked to form the battery stack. A plurality of battery cells can be stacked to form a battery stack, such that the bipolar plate of one battery cell abuts a corresponding metal anode of an adjacent battery cell.

Further, in embodiments of the present invention, an air cathode can be manufactured by (i) dispersing catalysts, conductive aids, and binders in ethanol, (ii) homogenizing the mixture to form a catalyst ink, (iii) applying the catalyst ink on a gas diffusion layer, and (iv) drying the catalyst-loaded gas diffusion layer. In an alternate embodiment, the air cathode can be manufactured by (i) mixing catalysts, conductive aids, hydrophobic agents, and binders in a little of water to form a dough, (ii) spreading the dough on an inert metallic screen, and (iii) hot pressing the dough spread on the inert metallic screen. As will be appreciated, the catalysts can be a bifunctional catalyst if the air cathode is to be used in a two-electrode battery cell, and the catalysts can be an ORR catalyst if the air cathode is to be used in a three-electrode battery cell.

The foregoing summary is illustrative only and is not intended to be in any way limiting. In addition to the illustrative aspects, embodiments, and features described above, further aspects, embodiments and features will become apparent by reference to the drawings and the following detailed description of the invention.

EXAMPLES OF THE INVENTION

While preferable embodiments of the invention have been described herein, it will be obvious to those skilled in the art that such embodiments are provided by way of example only. Numerous changes, substitutions and variations will occur to those skilled in the art without departing from the invention. It should be understood that various alternatives to the embodiments of the invention described herein may be adopted in practicing the invention. The following non-limiting examples are provided as illustrative of the invention.

Example A

Figure 18:
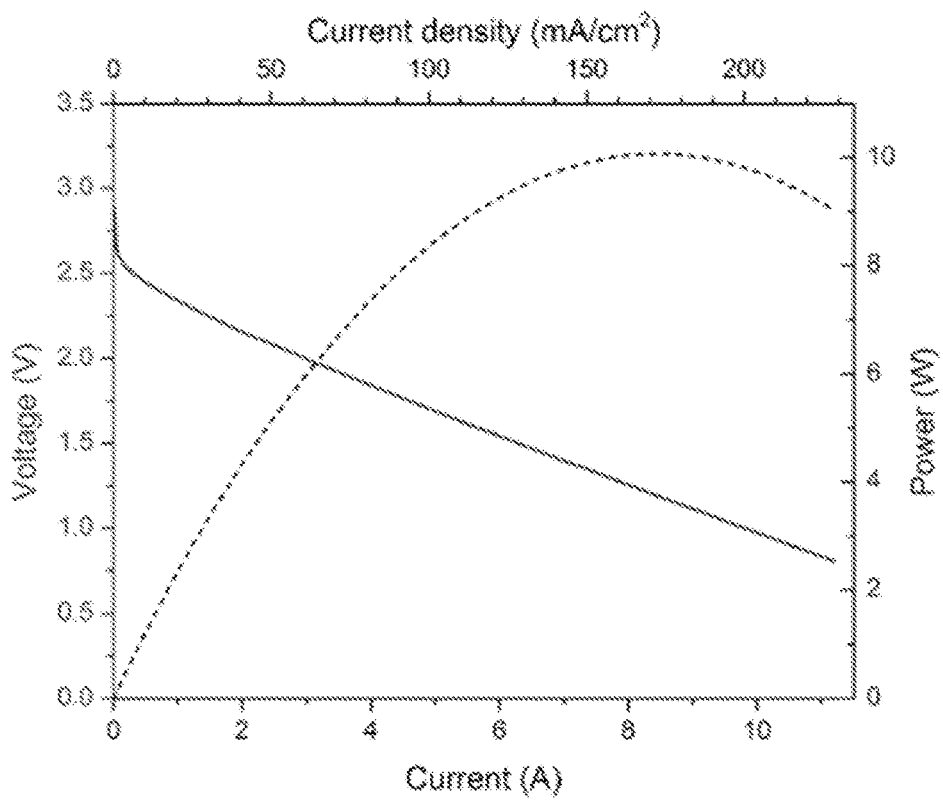
FIG. 18 shows the battery performance data (battery stack voltage and power output plotted against discharge current) when the two-cell battery stack with two-electrode design was subjected to a quick discharge at linear rate of 0.1 V/s.

In an non-limiting illustration of the present invention, a battery stack with two cells, each with working area of ~49 $cm^2$, was constructed in accordance with the two-electrode design. Zinc plates of 3 mm thickness were cut in accordance with the size and shape of metal anode 10, and bipolar plates 70 of FIG. 5 were used for air supply to the cathode 30, which was fabricated by spraying bifunctional electro catalysts uniformly onto the surface of carbon paper to achieve an average loading of 1 $mg/cm^2$. 6M KOH solution (with 0.4M zinc acetate) was used as electrolyte and circulated through the battery stack. The assembled battery stack was then discharged at a constant rate of 0.1 V/s and the data were collected with an Autolab PGSTAT302N and presented in FIG. 18. A current of 11.2 A can be achieved when the battery stack was discharged to 0.8V, whereby a maximum power density of 102.7 $mW/cm^2$ was observed at 1.2V, at which point the two-cell battery stack delivered its maximum output power of 10 W, i.e. 5 W per single cell on average. Thus, the device advantageously provides low impedance and high electrochemical activity of electrodes, and displays superior performance at discharge.

Example B

Figure 19:
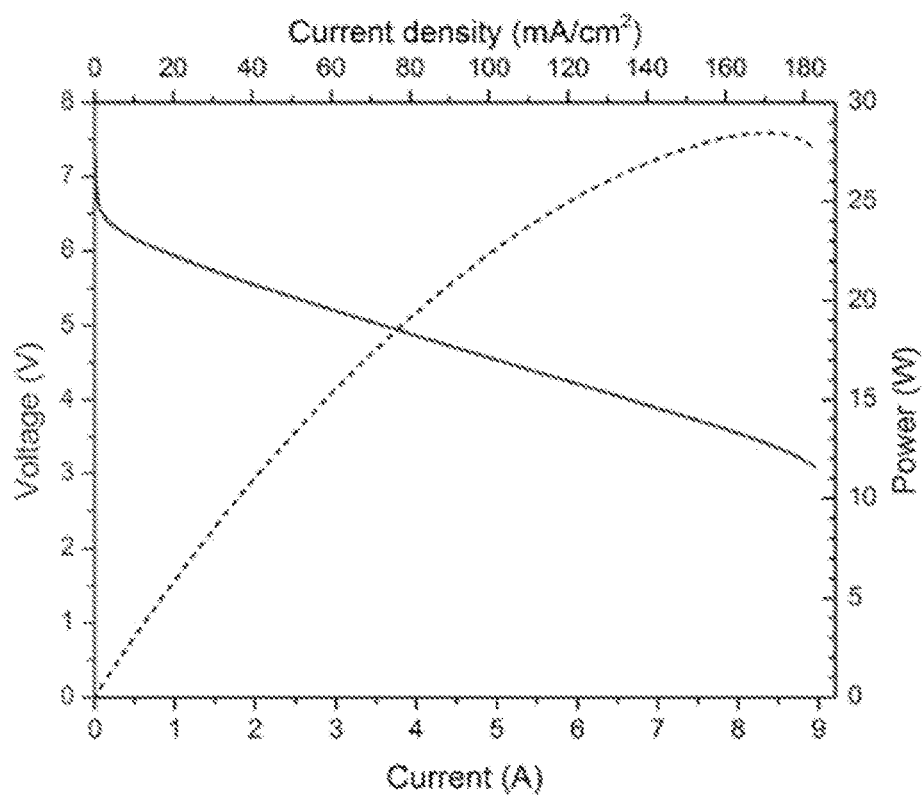
FIG. 19 shows the battery performance data (battery stack voltage and power output plotted against discharge current) when the five-cell battery stack with two-electrode design was subjected to a quick discharge at linear rate of 0.1 V/s.
Figure 20:
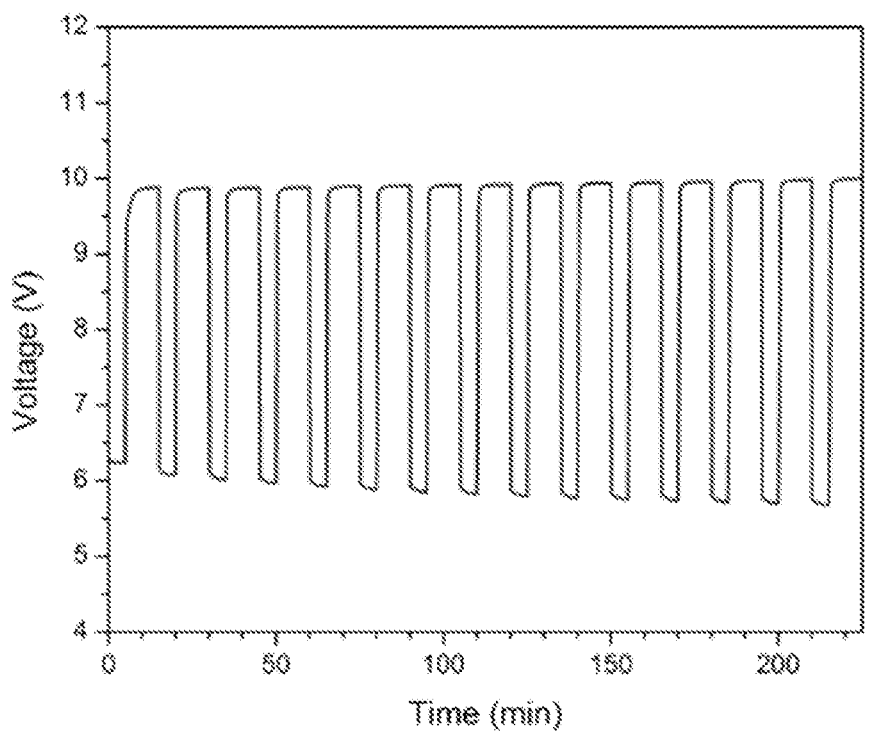
FIG. 20 shows the battery performance data (battery stack voltage and power output plotted against discharge current) when the five-cell battery stack with two-electrode design was subjected to charge-discharge cycles at the constant current of 0.32 A (discharging) and 0.16 A (charging) respectively.
Figure 21:
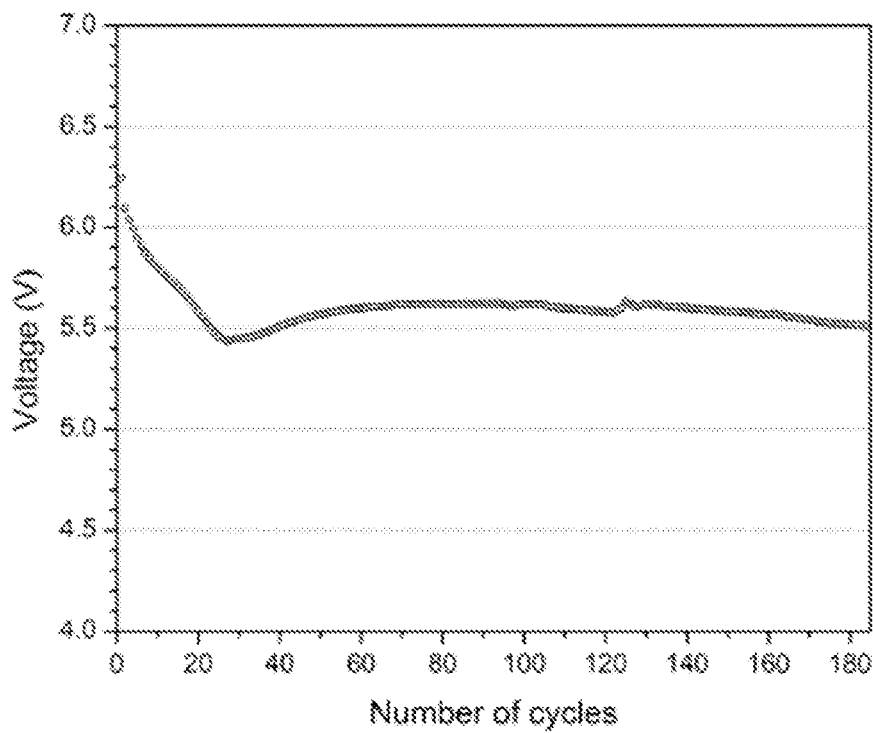
FIG. 21 shows the battery performance data (battery stack voltage at discharge plotted against number of cycles) when the five-cell battery stack with two-electrode design was subjected to charge-discharge cycles at the constant current of 0.32 A (discharging) and 0.16 A (charging) respectively.

In yet another further illustration of this invention, a battery stack with five cells, each with working area of ~49 cm², was constructed in accordance with the two-electrode design. Zinc plates of 3 mm thickness were cut in accordance with the size and shape of metal anode 10, and bipolar plates 70 shown in were used for air supply to the cathodes 30, which were fabricated by spraying bifunctional electrocatalysts uniformly onto the surface of carbon paper to achieve an average loading of 1 mg/cm². 6M KOH solution (with 0.4M zinc acetate) was used as electrolyte and circulated through the battery stack. The assembled battery stack was discharged at a constant rate of 0.1 V/s and the data were collected with an Autolab PGSTAT302N and presented in FIG. 19. A current of 9.0 A can be achieved when the battery stack was discharged to 3.0V, whereby a maximum power density of 116.2 mW/cm² was observed at 3.4V, at which point this device of five-cell stack delivered its maximum output power of 28.5 W, i.e. 5.7 W per single cell on average. The assembled battery stack was then subjected to constant current charge-discharge circles at room temperature. In each cycle, the battery stack was discharged at constant current of 0.32 A (~6.53 mA/cm² current density) for 5 min and charged at constant current of 0.16 A (~3.27 mA/cm² current density) for 10 min. As shown in FIG. 20, the battery stack displays 9.79V at charge for the 1st cycle and 9.85V at charge for the 15th cycle, and the discharge voltage decreases from 6.24V at 1st cycle to 5.70V at the 15th cycle, equivalent to a round trip efficiency drop from 63.7% to 57.9%. As the charge-discharge circles increase, the discharge voltage of the battery stack started to recover from the 30th cycle, and maintained at 5.6V before it dropped back to 5.5V beyond the 180th cycle (FIG. 21). Although the same air cathode is used for both discharging and charging, the battery stack displayed good cyclability with satisfactory round trip efficiency.

Example C

Figure 22:
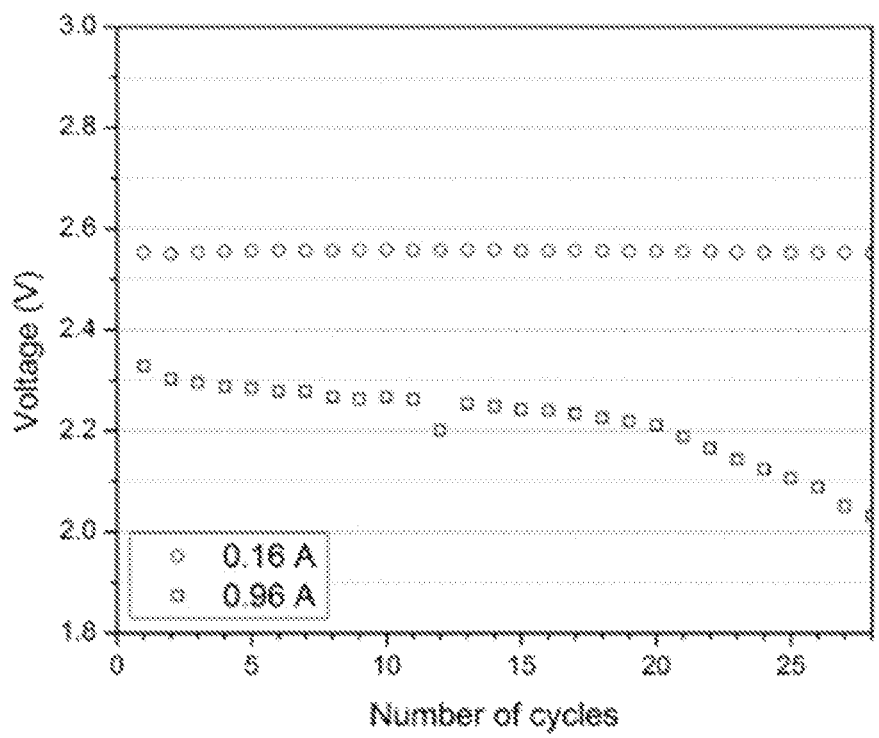
FIG. 22 shows the battery performance data (battery stack voltage at discharge plotted against number of cycles) when the two-cell battery stack with three-electrode design was subjected to charge-discharge cycles at the constant current of 0.16 A and 0.96 A, respectively. The two cells in this battery stack were charged in parallel connection in each cycle at 2.05V.
Figure 23:
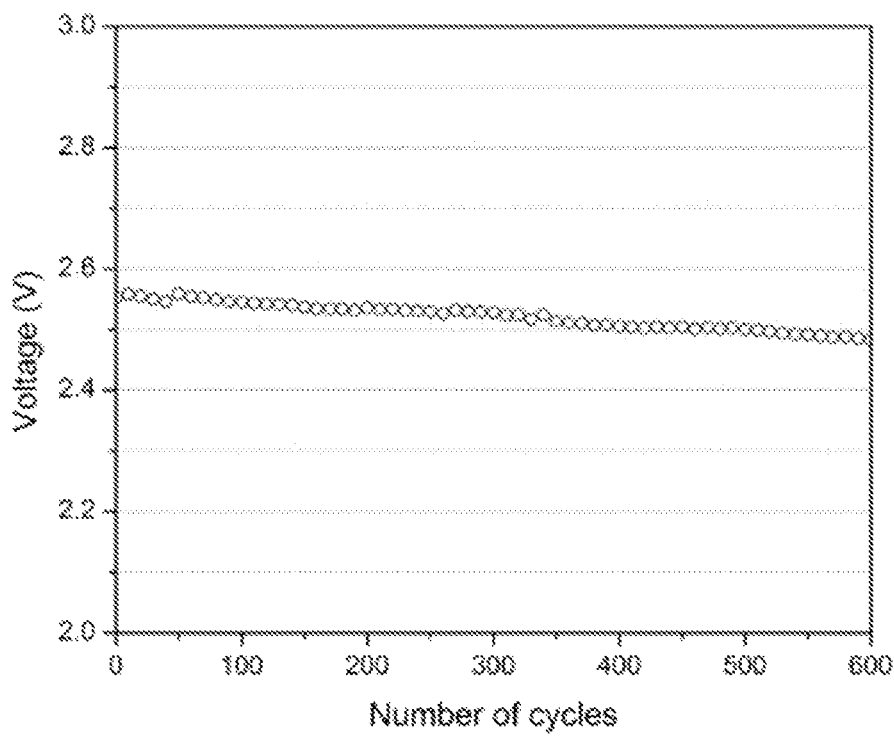
FIG. 23 shows the battery performance data (battery stack voltage at discharge plotted against number of cycles) up to 600 cycles when the two-cell battery stack with three-electrode design was subjected to charge-discharge cycles at the constant current of 0.16 A. The two cells in this battery stack were charged in parallel connection in each cycle at 2.05V.

In yet another further illustration of this invention, a battery stack with two cells, each with working area of ~49 cm², was constructed in accordance with the three-electrode design. Zinc plates of 3 mm thickness were cut in accordance with the size and shape of metal anode 10. Nickel foam of 3 mm thickness was cut in accordance with the size and shape of auxiliary electrode 32, cotton was used as the porous separator 62, and bipolar plates of 40 FIG. 4 were used for air supply to the cathodes 30, which was fabricated by spraying bifunctional electrocatalysts uniformly onto the surface of carbon paper to achieve an average loading of 1 mg/cm². 6M KOH solution (with 0.4M zinc acetate) was used as electrolyte and circulated through the battery stack. The assembled battery stack was then subjected to constant current charge-discharge circles at 0.16 A at room temperature, which was equivalent to 3.27 mA/cm² for discharge and 1.63 mA/cm² for charge. The duration of charge and discharge in each cycle is 4 min and 2 min, respectively. The data were collected with an Autolab PGSTAT302N and presented in FIGS. 22 and 23. In the initial cycles, the discharge voltage per cell is 1.28V, equivalent to a round trip efficiency of 62.4%. At the end of 600th cycle, the discharge voltage per cell is slightly reduced to 1.24V, equivalent to a round trip efficiency of 60.5%. Thus, it can be shown that the rechargeable device has excellent cyclability and good intermediate rate of charge and discharge.

Example D

In yet another further illustration of this invention, a battery stack with two cells, each with working area of ~49 cm², was constructed in accordance with the three-electrode design. Zinc plates of 3 mm thickness were cut in accordance with the size and shape of metal anode 10. Nickel foam of 3 mm thickness was cut in accordance with the size and shape of auxiliary electrode 32, cotton was used as the porous separator 62, and bipolar plates of FIG. 5 were used for air supply to the cathodes 30, which was fabricated by spraying bifunctional electrocatalysts uniformly onto the surface of carbon paper to achieve an average loading of 1 mg/cm². 6M KOH solution (with 0.4M zinc acetate) was used as electrolyte and circulated through the battery stack. The assembled battery stack was then subjected to constant current charge-discharge circles at 0.96 A at room temperature, which was equivalent to 19.6 mA/cm² for discharge and 9.8 mA/cm² for charge. The duration of charge and discharge in each cycle is 30 min and 10 min, respectively. The data were collected with an Maccor 4300 battery tester and presented in FIG. 22. In the initial cycles, the discharge voltage per cell is 1.16V, equivalent to a round trip efficiency of 56.6%. At the end of battery life (27th cycle), the discharge voltage per cell is 1.02V, equivalent to a round trip efficiency of 49.8%. While this large charge and discharge rate of 0.96 A diminished the cell life, this device still maintained the rechargeability for more than 18 hr of battery testing with satisfactory efficiency.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A rechargeable metal-air battery cell comprising:
   a bipolar plate defining a plurality of air channels;
   an air cathode abutting the bipolar plate such that the air cathode is in fluid communication with the air channels;
   a plenum frame comprising a first major surface and a second major surface opposite the first major surface, wherein the air cathode is adjacent the first major surface; and
   a metal anode adjacent the second major surface of the plenum frame.

2. The rechargeable metal-air battery cell as claimed in claim 1, wherein the bipolar plate comprises:
   a first major surface configured to abut a metal anode of an adjacent cell; and
   a second major surface comprising a plurality of first grooves.

3. The rechargeable metal-air battery cell as claimed in claim 2, wherein the bipolar plate further comprises an edge surface, the edge surface comprising a plurality of holes in fluid communication with the plurality of first grooves for forming the air channels.

4. The rechargeable metal-air battery cell as claimed in claim 2, wherein the first major surface further comprises a plurality of second grooves extending across the bipolar plate, the second grooves being in fluid communication with the first grooves for forming the air channels.

5. The rechargeable planar metal-air battery cell as claimed in claim 1, wherein the air cathode comprises a bifunctional catalyst, the bifunctional catalyst comprising one or more of a group consisting of: cobalt oxides where the cobalt has an oxidation state of +2 to +3, manganese oxide where the manganese has an oxidation state of +2 to +4, binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, and perovskite oxides containing lanthanide, rare earth metals and first-row transition metals.

6. The rechargeable metal-air battery cell as claimed in claim 1, further comprising an auxiliary electrode disposed within the plenum frame, the auxiliary electrode configured for charging of the battery cell.

7. The rechargeable planar metal-air battery cell as claimed in claim 6, wherein the auxiliary electrode comprises an oxygen evolution reaction (OER) catalyst, the OER catalyst comprising one or more of a group consisting of: ruthenium oxides, metallic ruthenium, metallic iridium, iridium oxides, cobalt oxides where the cobalt has an oxidation state of +2 to +3, binary cobalt-manganese binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, and perovskite oxides containing lanthanide, rare earth metals and first-row transition metals.

8. The rechargeable planar metal-air battery cell as claimed in claim 6, wherein the air cathode comprises an oxygen reduction reaction (ORR) catalyst, the ORR catalyst comprising one or more of a group consisting of: cobalt oxides where the cobalt has an oxidation state of +2 to +3, manganese oxide where the manganese has an oxidation state of +2 to +4, binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, perovskite oxides containing lanthanide, rare earth metals and first-row transition metals, platinum-carbon, platinum alloys-carbon, nitrogen-doped carbon, boron-doped carbon, phosphorous-doped carbon, iron-carbon, cobalt-carbon, and iron cobalt-carbon.

9. A battery stack comprising a plurality of rechargeable metal-air battery cells, each rechargeable metal-air battery cell comprising:
a biopolar plate defining a plurality of air channels;
an air cathode abutting the bipolar plate such that the air cathode is in fluid communication with the air channels;
a plenum frame comprising a first major surface and a second major surface opposite the first major surface, wherein the air cathode is adjacent the first major surface; and
a metal anode adjacent the second major surface of the plenum frame, wherein the bipolar plate of one battery cell abuts a corresponding metal anode of an adjacent battery cell to provide electrical connection with said adjacent cell.

10. The battery stack as claimed in claim 9, further comprising:
a first end plate and a second end plate, the plurality of rechargeable metal-air battery cells being disposed between the first and the second end plates; and
a compression device configured to act on the first and the second end plates to exert a compressive force on the plurality of rechargeable metal-air battery cells.

11. A method of manufacturing a rechargeable metal-air battery cell, the method comprising:
providing a metal anode;
disposing a plenum frame comprising a first major surface and a second major surface opposite the first major surface such that the metal anode is adjacent the second major surface;
disposing an air cathode adjacent the first major surface of the plenum frame; and
attaching a bipolar plate comprising a plurality of air channels to the air cathode, such that the air cathode is in fluid communication with the air channels.

12. The method as claimed in claim 11, wherein attaching the bipolar plate comprises providing the bipolar plate having:
a plurality of first grooves on a first major surface of the bipolar plate; and
a plurality of holes on an edge surface of the bipolar plate, wherein the plurality of holes are in fluid communication with the plurality of first grooves for forming the air channels.

13. The method as claimed in claim 11, wherein attaching the bipolar plate comprises providing the bipolar plate having:
a plurality of first grooves on a first major surface of the bipolar plate; and
a plurality of second grooves on a second major surface opposite the first major surface, wherein the second grooves extend across the bipolar plate and are in fluid communication with the first grooves for forming the air channels.

14. The method as claimed in claim 11, wherein the air cathode comprises a bifunctional catalyst, the bifunctional catalyst comprising one or more of a group consisting of: cobalt oxides where the cobalt has an oxidation state of +2 to +3, manganese oxide where the manganese has an oxidation state of +2 to +4, binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, and perovskite oxides containing lanthanide, rare earth metals and first-row transition metals.

15. The method as claimed in claim 11, further comprising disposing an auxiliary electrode within the plenum frame, and configuring the auxiliary electrode for charging of the battery cell.

16. The method as claimed in claim 15, wherein the auxiliary electrode comprises an oxygen evolution reaction (OER) catalyst, the OER catalyst comprising one or more of a group consisting of: ruthenium oxides, metallic ruthenium, metallic iridium, iridium oxides, cobalt oxides where the cobalt has an oxidation state of +2 to +3, binary cobalt-manganese binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, and perovskite oxides containing lanthanide, rare earth metals and first-row transition metals.

17. The method as claimed in claim 16, wherein the air cathode comprises an oxygen reduction reaction (ORR) catalyst, the ORR catalyst comprising one or more of a group consisting of: cobalt oxides where the cobalt has an oxidation state of +2 to +3, manganese oxide where the manganese has an oxidation state of +2 to +4, binary cobalt-manganese spinel oxides, binary cobalt-nickel spinel oxides, binary nickel-iron spinel oxides, binary cobalt-iron oxides, complex spinel oxides containing some or all elements of cobalt, manganese, iron, nickel and copper, perovskite oxides containing lanthanide and first-row transition metals, perovskite oxides containing lanthanide, rare earth metals and first-row transition metals, platinum-carbon, platinum alloys-carbon, nitrogen-doped carbon, boron-doped carbon, phosphorous-doped carbon, iron-carbon, cobalt-carbon, and iron cobalt-carbon.

* * * * *